United States Patent [19]

Tutt

[11] Patent Number: 5,339,751
[45] Date of Patent: Aug. 23, 1994

[54] APPARATUS AND METHOD FOR CHARGING COMBUSTIBLE SOLIDS INTO A ROTARY KILN

[75] Inventor: James R. Tutt, Nash, Tex.

[73] Assignees: Ash Grove Cement Company, Overland Park, Kans.; Cadence Environmental Energy, Inc., Michigan City, Ind.

[21] Appl. No.: 938,948

[22] Filed: Sep. 1, 1992

[51] Int. Cl.$^5$ .......................... F23G 7/04; F23N 5/18
[52] U.S. Cl. ..................... 110/186; 110/246; 110/346; 414/158; 414/161
[58] Field of Search ............... 110/346, 246, 226, 185, 110/186, 267, 276, 220; 414/147, 149, 158-160, 161-167, 170, 199

[56] References Cited

U.S. PATENT DOCUMENTS

| | | | |
|---|---|---|---|
| 2,726,077 | 12/1955 | Dow | 414/158 |
| 3,357,689 | 12/1967 | Arnesen et al. | 263/33 |
| 3,925,091 | 12/1975 | Yoshida et al. | 106/100 |
| 3,986,624 | 10/1976 | Cates et al. | 214/23 |
| 4,182,246 | 1/1980 | Lombana et al. | 110/188 |
| 4,466,361 | 8/1984 | Henery et al. | 110/346 |
| 4,850,290 | 7/1989 | Benoit et al. | 110/346 |
| 4,913,406 | 4/1990 | Fukushima et al. | 266/92 |
| 4,930,965 | 6/1990 | Peterson et al. | 414/149 |
| 4,974,529 | 12/1990 | Benoit et al. | 110/346 |
| 4,984,524 | 1/1991 | Mindermann et al. | 110/346 |
| 5,078,594 | 1/1992 | Tutt et al. | 432/103 |
| 5,083,516 | 1/1992 | Benoit et al. | 110/344 |

FOREIGN PATENT DOCUMENTS

| | | | |
|---|---|---|---|
| 1223811 | 9/1966 | Fed. Rep. of Germany | 414/149 |
| 120964 | 9/1979 | Japan | 110/346 |
| 1647211 | 5/1991 | U.S.S.R. | |

OTHER PUBLICATIONS

Huhta, R., "Waste Fuel Survey Report", Rock Products, Apr. 1985, pp. 40–43.
Shubin, V. I., "Modernization of Rotary Furnaces for Burning Used Automobile Tires", Nlltsement, Razdanski Cement Plant, date unknown, pp. 17–18.

Primary Examiner—Henry A. Bennett
Assistant Examiner—William C. Doerrler
Attorney, Agent, or Firm—Barnes & Thornburg

[57] ABSTRACT

A firing system is provided for charging a plurality of incoming combustible fuel modules containing a known amount of a parameter of interest into a heated zone of a rotating kiln. The firing system separates incoming fuel modules into a plurality of stages based on the parameter amount in each fuel module. The system then removes fuel modules from the plurality of stages in a selected order to maintain an average parameter amount for fuel modules charged into the kiln at substantially a preselected level. The system charges fuel modules into the kiln in the selected order. The system determines an optimum time to charge each fuel module into the rotating kiln to maintain an average amount of the parameter of interest supplied to the kiln substantially at the preselected level.

68 Claims, 9 Drawing Sheets

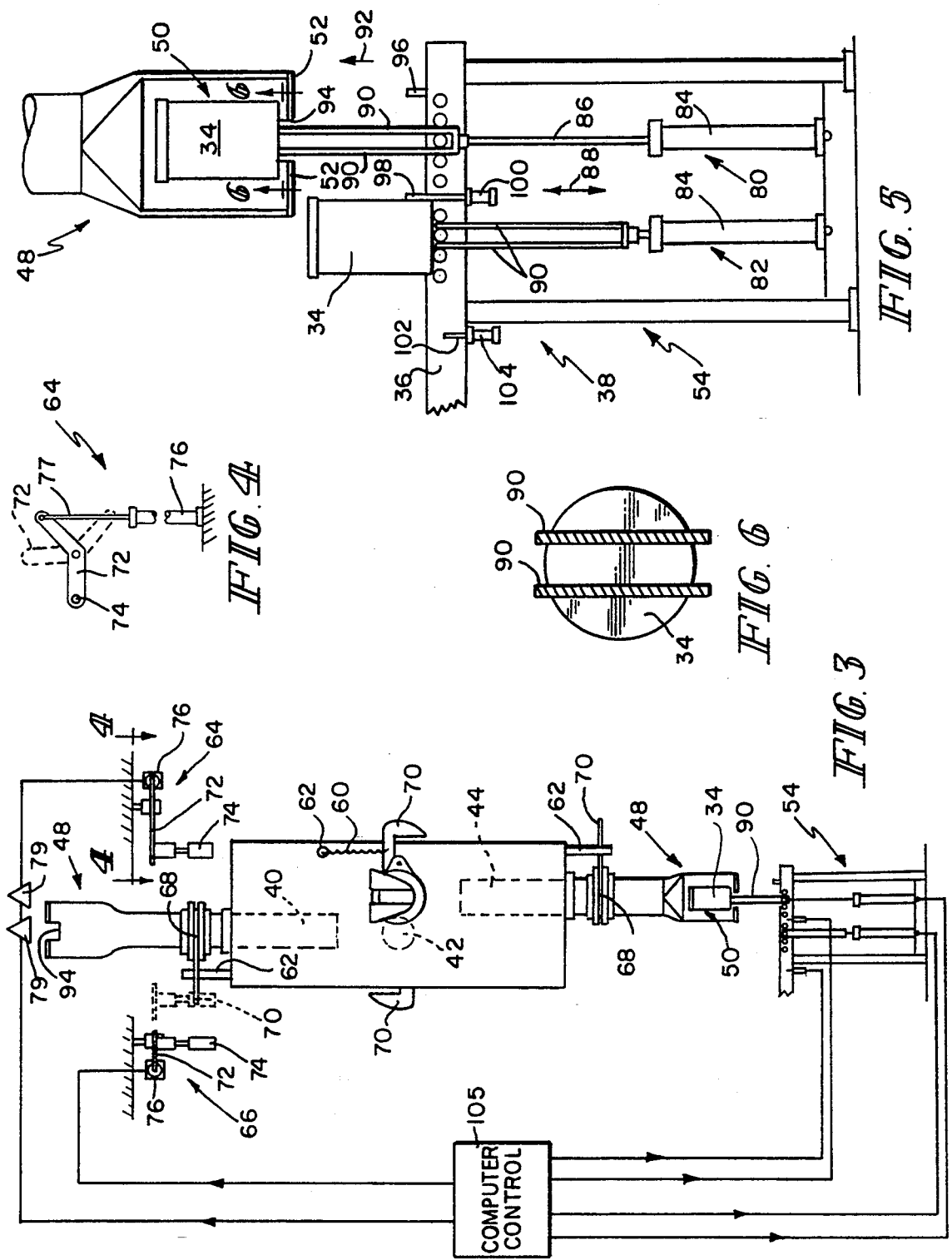

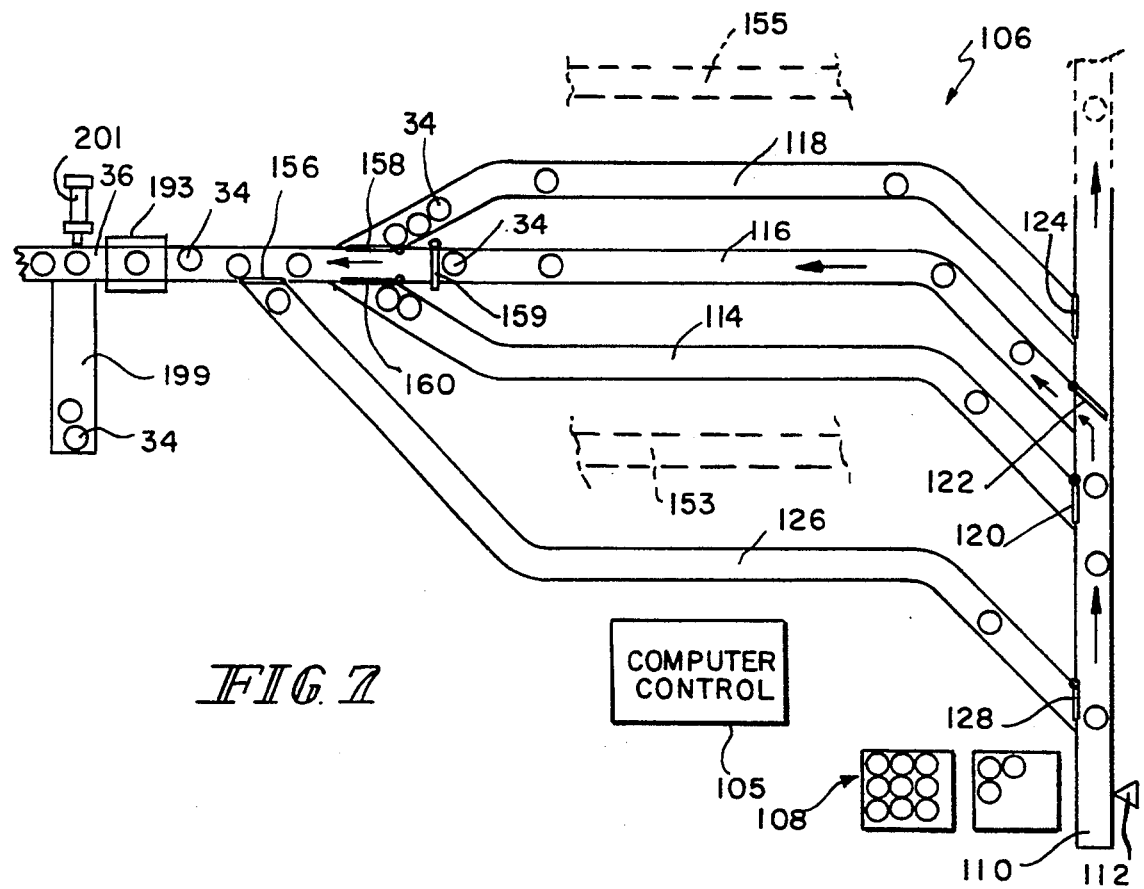

FIRING TABLE*

| Firing Interval (SEC) | Replacement Rate (%) | Containers/Hr. | SWDF (TPH) | Firing Rate (BTU x 10⁶) |
|---|---|---|---|---|
| 10 | 56 | 360 | 11.7 | 140.4 |
| 20 | 28 | 180 | 5.85 | 70.2 |
| 30 | 19 | 120 | 3.9 | 46.8 |
| 40 | 14 | 90 | 2.93 | 35.1 |
| 50 | 11 | 72 | 2.34 | 28.1 |
| 60 | 9 | 60 | 1.95 | 23.4 |
| 70 | 8 | 51 | 1.67 | 19.89 |
| 80 | 7 | 45 | 1.46 | 17.55 |
| 90 | 6 | 40 | 1.3 | 15.6 |
| 100 | 5.5 | 36 | 1.17 | 14.0 |

* Figures Are Rounded

FIG. 12

APPARATUS AND METHOD FOR CHARGING COMBUSTIBLE SOLIDS INTO A ROTARY KILN

BACKGROUND AND SUMMARY OF THE INVENTION

The present invention relates to an apparatus and method for charging combustible solids into rotary kilns. More particularly, the present invention provides an apparatus and integrated firing system for providing smoother firing of kilns and for controlling firing parameters of interest, including both combustion driven parameters and regulatory driven parameters.

Cement kilns have received favorable review from both federal and state environmental regulatory agencies for disposal of both liquid and solid combustible waste materials. Cement kilns provide a combination of high operating temperatures and long residence times, both of which are favorable conditions for complete combustion of organic components of waste and chemical combination of inorganic components with the reactive in-process mineral components. Combustible waste solids provide a source of inexpensive energy for the mineral process in industry.

For many years, regulation compliant use and disposal of waste in operating kilns was limited to combustible liquid or "pumpable" hazardous waste. Liquid waste materials are easily blended with each other and with conventional fuels to provide homogeneous liquids that can be burned in the gaseous phase at the firing end of the kiln with little or no modification of kiln burner configuration. Solid waste, however, can occur in multiplicity of forms, from hard crystalline solids to viscous, sticky sludges. They are not easily blended, and they present significant engineering challenges for their safe handling and delivery into rotating kilns. Several apparatus have been designed to facilitate firing of solid wastes into kilns. U.S. Pat. No. 4,850,290, issued Jul. 25, 1989, incorporated herein by reference, describes an apparatus and method for delivering containerized waste to both pre-heater type and conventional long wet or dry kilns at the point in the process where the kiln gas temperature is such that volatized components are consumed with high destruction and removal efficiency. The '290 patent describes a device for delivering containerized waste through the wall of a kiln cylinder during kiln operation. The apparatus comprises a port, preferably with a mechanical closure, formed in the kiln cylinder wall. The port is aligned with a drop tube inside the kiln cylinder. The drop tube prevents hot mineral material in the kiln from escaping through the port or contacting closure. The device is utilized to deliver containerized waste into the kiln at predetermined time during kiln cylinder rotation.

Other apparatus and methods for delivering solid fuels, especially solid waste fuels, are known in the art. See, for example, U.S. Pat. No. 5,078,594, incorporated herein by reference, which discloses a charging apparatus for delivering tires or other combustible waste solids through a port into a rotating kiln.

One object of this present invention is to provide improved firing system for controlling both combustion driven parameters and regulatory driven parameters of dimensioned fuel modules charged into rotary kilns.

Another object of this present invention is to provide an automated system for smoother firing of the kilns, thereby simplifying a kiln operator's tasks.

Yet another object of this present invention is to increase capacity capabilities for firing solid waste derived fuel in the kilns.

Still another object of this present invention is to provide an apparatus and method capable of charging solid waste into a kiln at a variable rate when the kiln is rotating at a fixed rate.

Those and other objects of this invention are accomplished by providing a firing system and apparatus which controls the delivery of solid waste to kilns. The firing system of the present invention includes a staging assembly having a plurality of staging conveyors coupled to a main transfer assembly for transferring containers to the kiln. The contents of each container are sampled and coded with appropriate parameter information necessary to control the input of various parameters into the kiln. The kiln firing mechanism is concerned only with the primary combustion driven firing parameters. The primary or priority parameters for controlling kiln firing are heat energy (BTUs) and weight.

Secondary parameters for controlled kiln firing can be tailored to regulatory and/or combustion driven parameter requirements as needed. The present invention produces the most homogeneous and "hold point averaged" parameter of interest that is possible. In other words, the control system of the present invention operates to maintain selected parameters of interest as close as possible to a specified hold point parameter amount. Any parameter which the operator desires to control can be controlled by the system of the present invention. An example of some combustion driven parameters include heat energy or BTUs, weight, chloride content, volatility, particle size, iron content, and total inorganic residue content. Examples of regulatory driven parameters include the amount of cadmium, lead, arsenic, chromium, barium, or mercury contained in the solid waste charged with the kiln. These parameters remain indigenous to the geographic location, fuel supplier and regulatory climate.

Palletized loads of fuel modules or containers containing solid waste derived fuel are delivered from processors to the kiln site. Solid waste material in each of the containers is sampled to determine the amount of the parameter or element of interest in each of the containers. The containers are then labeled using an adhesive-backed bar code label indicating the quantity of the parameters of interest in the container. Coded containers are loaded onto an input conveyor and transported toward a staging assembly including a series of staging conveyors. A bar code reader reads the parameter information on each container and loads each container onto an appropriate staging conveyor based upon the parameter information. The parameter value is stored in a register of a computer memory for access during charging of the containers into the kiln. A computer is used to control delivery of the containers from the input conveyor to the appropriate staging conveyor by sending signals to open and close appropriate gates on staging conveyors. Containers on each staging conveyor are accumulated until the containers are required upon demand from the firing system.

The computer controlled firing system automatically calculates the most correct combination of containers having high and low parameter values to approximate a desired hold point of the parameter value. The computer controls gates to open and close the staging assembly conveyors to load containers onto a transfer conveyor in an appropriate sequence. Containers moving on the transfer conveyor pass over a scale capable of weighing the containers on the fly and indicating the instantaneous feed rate and cumulative feed rate to the central control. The cumulative feed rate is printed out at the end of a shift as total weight and total number of containers.

Each container is presented to a charging apparatus assembly only at an appropriate time commensurate with the hold point firing range as set in central control and with an inhibit/non-inhibit signal provided by a kiln exit gas monitoring system. This signal is controlled by trigger levels preset to limits required by the gas emissions permit and automatically discontinues firing of the system when the outputs exceed regulatory limits.

The fuel flow rate to the kiln is variable in a step-wise manner and is controllable by presentation of the fuel to automatic pick-up tubes designed as an integral part of the charging apparatus. By providing a plurality of pick-up tubes, and by controlling the time at which containers are presented to selected pick-up tubes, it is possible to provide a variable input rate for containers into a kiln having a fixed rotation rate. The firing system also controls opening and closing of the port in each tube by controlling operation of a valve. The valve remains closed until it is time to drop the solid waste into the kiln to prevent the undesirable flow of ambient air into the kiln via the tubes. The computer control generates a signal to open the valve at the precise moment to drop the containers into the kiln and closes the valve after the fuel has been charged to the kiln. Charging of the kiln is verified by an infrared sensor which senses the absence of the fuel in the entry tube.

According to one aspect of the present invention, an apparatus is provided for charging combustible fuel modules into a heated zone of a rotating kiln cylinder. The apparatus includes a generally cylindrical outer wall configured to replace a section of the rotating kiln cylinder. The cylindrical outer wall is formed to include at least two ports therein. The ports are spaced apart along a periphery of the outer wall. The apparatus also includes means for charging fuel modules into the kiln through the at least two radially spaced apart ports formed in the outer wall so that more than one fuel module can be charged into the kiln cylinder at radially spaced apart locations during each revolution at the kiln cylinder. The charging means is coupled to the outer wall.

In the illustrated embodiment, the charging means includes at least two drop tubes, one drop tube extending through each of the ports and into the heated zone of the rotating kiln cylinder so that fuel modules can be charged into the rotating kiln cylinder through the drop tubes at radially spaced apart locations of the kiln cylinder.

Also in the illustrated embodiment, the apparatus further includes a closure for each port. Each closure is movable between a port-closed position and a port-opened position. The apparatus also includes means for moving each closure selectively between the port-closed position and the port-opened position to charge modules through the selected port and into the heated zone.

The apparatus still further includes a staging assembly for supporting fuel modules, and means for transferring a fuel module between the staging assembly and a selected one of the drop tubes to charge the fuel module into the kiln cylinder through the port in communication with the selected drop tube. The transferring means includes at least two transfer tubes, one transfer tube being coupled to each drop tube and means for selectively transferring fuel modules from the staging assembly into a selected transfer tube to charge the fuel module into the kiln cylinder through the drop tube aligned with the selected transfer tube. The means for selectively transferring fuel modules from the staging assembly into a selected transfer tube includes an elevator assembly for lifting fuel modules upwardly from the staging assembly into alignment with the selected transfer tube as the kiln cylinder rotates.

The illustrated embodiment further discloses a charging apparatus including a first set of drop tubes aligned at a first axial position along the longitudinal axis of the generally cylindrical outer wall, and a second set of drop tubes aligned at a second axial position along the longitudinal axis of the generally cylindrical outer wall spaced apart from the first axial position. The apparatus also includes first means for transferring a fuel module into a selected drop tube in the first set of drop tubes, and second means for transferring a fuel module into a selected drop tube in the second set of drop tubes.

The first and second transferring means each include an elevator for lifting fuel modules upwardly from the staging assembly into alignment with the first and second sets of drop tubes, respectively. The elevators each include a pair of spaced-apart, parallel plates for engaging a bottom surface of each fuel module, and means for moving the parallel plates relative to the staging assembly to lift the fuel module away from the staging assembly.

According to another aspect of the present invention, a firing system is provided for charging a plurality of incoming combustible fuel modules containing a known amount of a parameter of interest into a heated zone of a rotating kiln. The firing system includes means for separating incoming fuel modules into a plurality of stages based on the parameter amount in each fuel module, and means for removing fuel modules from the plurality of stages in a selected order to maintain an average parameter amount for fuel modules charged into the kiln at substantially a preselected level. The firing system also includes means for charging fuel modules into the kiln in the selected order.

In the illustrated embodiment of the invention, incoming fuel modules are transported to the firing system on an inlet conveyor. The separating means includes a plurality of staging conveyors and means for deflecting each incoming fuel module from the inlet conveyor onto a selected staging conveyor based on the parameter amount in each fuel module.

The charging means includes a transfer conveyor for moving fuel modules from the plurality of staging conveyors toward the kiln and means for transferring fuel modules from the transfer conveyor into the kiln. The means for removing fuel modules from the plurality of stages includes a plurality of gates for blocking movement of fuel modules from the plurality of staging conveyors onto the transfer conveyor and means for selectively opening the gates to permit movement of fuel modules from the plurality of staging conveyors onto the transfer conveyor in the selected order. The means for selectively opening the plurality of gates includes means for determining which of the next available fuel modules in each of the plurality of stages will provide an optimum parameter value to maintain the average value of the parameter of interest supplied to the kiln at substantially the preselected level.

According to yet another aspect of the present invention, an apparatus is provided for charging a plurality of combustible solid waste fuel modules containing a known amount of a parameter of interest into a heated zone of a rotating kiln. The apparatus includes means for determining an optimum time to charge each fuel module into the rotating kiln to maintain the average value of the parameter of interest supplied to the kiln substantially at a preselected level, and means for charging each fuel module into the kiln at substantially said optimum time.

In the illustrated embodiment, the apparatus also includes means for storing the amount of the parameter of interest by weight of each fuel module, and means for weighing each fuel module. The apparatus further includes means for calculating the amount of the parameter of interest in each fuel module using the stored amount of the parameter of interest in each fuel module and the measured weight of each fuel module.

The determining means includes means for calculating an optimum firing interval for a next available fuel module based upon an average parameter value of fuel modules previously charged into the kiln and the parameter value of the next available fuel module. The firing interval is selected to maintain the average parameter value at substantially said preselected level.

According to still another aspect of the invention, a method is provided for charging a plurality of incoming fuel modules containing combustible material into a heated zone of a rotating kiln. The method includes the steps of separating the incoming fuel modules into a plurality of different stages based upon the amount of the parameter contained within each fuel module, and removing fuel modules stored in the plurality of stages in a selected order to maintain an average amount of the parameter charged into the kiln at substantially a preselected level. The method also includes the step of charging the selected modules into the kiln in the selected order.

In the illustrated method, the removing step includes the steps of calculating which of the next available fuel modules from the plurality of stages provides an optimum parameter amount to maintain the average parameter amount at substantially said preselected level, and transferring the next available fuel module from the stage which provides the optimum parameter amount computed during the calculating step to the kiln for the charging step.

The method further includes the steps of sampling the combustible material in each of the plurality of fuel modules to determine an amount of a parameter of interest within each fuel module, and labeling the fuel modules to indicate the amount of the parameter within each fuel module. The method still further includes the step of storing the amount of the parameter in each fuel module in a computer memory.

The method also includes the steps of determining an optimum time to charge each fuel module into the rotating kiln to maintain the average value of the parameter of interest supplied to the kiln substantially at a preselected level. Each fuel module being charged into the kiln at substantially said optimum time during the charging step.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 3 is a diagrammatical view illustrating the charging apparatus of FIG. 2, and first and second cam actuators and an elevator assembly to control operation of the charging apparatus.

FIG. 4 is a sectional view taken along lines 4—4 of FIG. 3 illustrating one cam actuator in an energized position.

FIG. 5 is an enlarged view of a portion of FIG. 3 illustrating details of the elevator assembly for transferring containers from a transfer conveyor into drop tubes of the charging apparatus.

FIG. 6 is a sectional view taken along lines 6—6 of FIG. 5 illustrating the position of two parallel plates for lifting a container upwardly from the transfer conveyor into a loading position.

FIG. 7 is a diagrammatical view illustrating a staging assembly and a transfer conveyor of the present invention.

FIG. 12 is a typical firing table illustrating a series of firing intervals, replacement rates, number of containers per hour, total amount of solid waste delivered to the kiln, and the firing rate per hour for containers being charged into a representative kiln by the firing system.

DETAILED DESCRIPTION OF THE DRAWINGS

This invention relates to an apparatus and method for achieving environmentally sound disposal of combustible solid wastes in an operating rotary kiln. Rotary kilns can be of the conventional type or of the so-called preheater or pre-calcinator type. Common to each, however, is a heated, rotating cylinder containing in-process mineral material. In the widely used commercial process for the production of cement clinker, cement raw materials are calcinated and "clinkered" by passing finely divided raw materials through a rotating inclined rotary kiln or kiln cylinder. The requisite temperature for processing the mineral material is achieved by burning fuel such as gas, fuel oil, powdered coal, and the like in the gaseous atmosphere at the lower end of the kiln with gases moving countercurrent to the solids through the rotating kiln cylinder. With the high temperatures required for the process, fuel costs constitute a significant factor in the ultimate cost of the product. It is known that fuel costs can be reduced through burning of pumpable liquid hazardous fuels or through charging solid waste materials into the kiln cylinder.

One form of hazardous waste which has been successfully utilized in this process is a by-product of the production of liquid waste fuels already marketed by Cadence Chemical Resources under the name CHEM FUEL ® for burning in kiln operations. The solid hazardous waste by-products consist of non-volatile and non-extractable residues which consist principally of high molecular weight resins, polymers and residual volatiles. Preferably, the hazardous waste containerized for use in the present process should have a BTU value of greater than 5,000 BTUs/lb. Free liquids in the solid waste material should be minimized. If present, they may be absorbed using an organic absorbent material such as ground corn cobs or similar BTU contributing material.

Sealable containers for the hazardous waste should be fully compliant with applicable Department of Transportation standards for containment/shipment of hazardous waste materials. Sealable steel pales or drums are preferred. The container contributes both energy (iron is oxidized in the higher temperature zones near the discharge end of the kiln) and material (iron oxides) to the process chemistry. Other containers such as fiber and plastic may also be used. The size of the containers is dependent on the energy value of the hazardous waste targeted for disposal and the capacity of the kiln to receive such containers.

Figure 1:
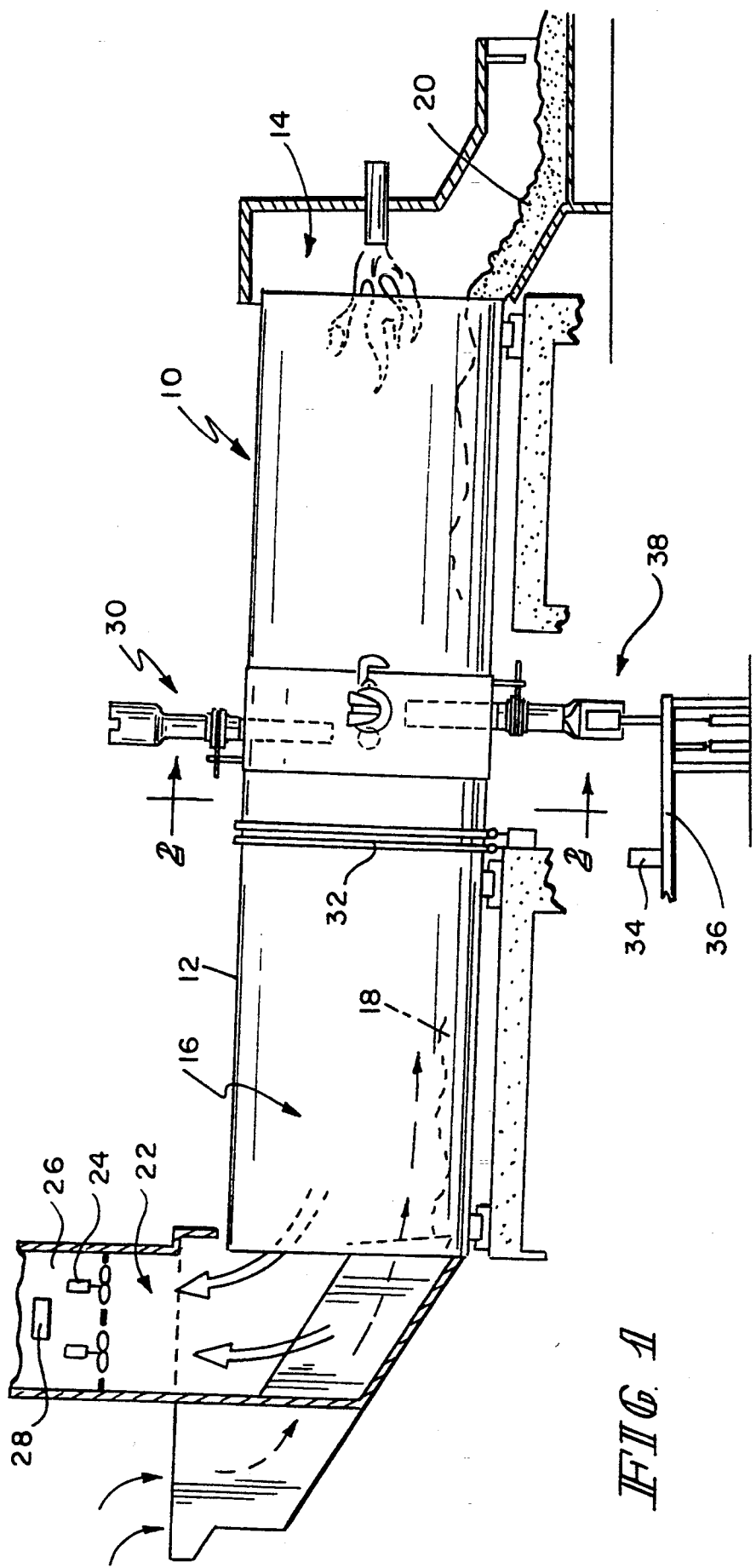
FIG. 1 is a schematic representation of a conventional rotary kiln equipped with a fuel charging apparatus of the present invention.

FIG. 1 illustrates a conventional long, dry and/or wet process kiln 10, including a kiln cylinder 12 having a lower fired end 14 and an upper end 16. Mineral material 18 is charged to upper end 16 of kiln cylinder 12. Kiln cylinder 12 is typically 10–12 feet or more in diameter and 300–500 feet in length and is inclined so that as cylinder 12 is rotated about its longitudinal axis at a rate of about 1 to 3 times per minute, raw materials 18 fed into upper end 16 of kiln cylinder 12 move toward the lower fired end 14 where the final clinkering process takes place. Product clinker 20 is discharged from fired end 14 for cooling and subsequent processing. Temperatures in the fired clinkering zone of kiln cylinder 12 range from about 1300° C. to about 1600° C. Gas temperatures in the kiln decrease to as low as 150°–200° C. at upper end 16 of so-called wet process kilns. Somewhat higher gas temperatures exist in the upper end 16 of dry process kilns.

Exhaust gases from kiln 10 may be treated to remove particulates at an emission control station 22 utilizing bag filters or electrostatic precipitators (not shown). The flow of gases through kiln cylinder 12 is controlled by blowers 24 which direct the exhaust gases through stack 26. A continuous emissions monitoring (CEM) system 28 is provided in stack 26 to monitor the amount of solid materials discharged into the atmosphere. As discussed below, continuous emissions monitoring system 28 discontinues firing of kiln 10 with hazardous waste if the amount of hazardous materials discharged through stack 26 exceeds regulatory limits.

A solid fuel charging apparatus 30 is located at approximately the mid-point of kiln cylinder 12. A thermocouple 32 is located about 10 to about 50 feet toward upper end 16 of kiln 10 from charging apparatus 30 to monitor the gas temperature in kiln cylinder 12. Fuel modules or containers 34 are located on a transfer conveyor 36. A transfer assembly 38 is provided for transferring containers into kiln 10 from transfer conveyor 36. Conveyor 36 is elevated above the ground.

Figure 2:
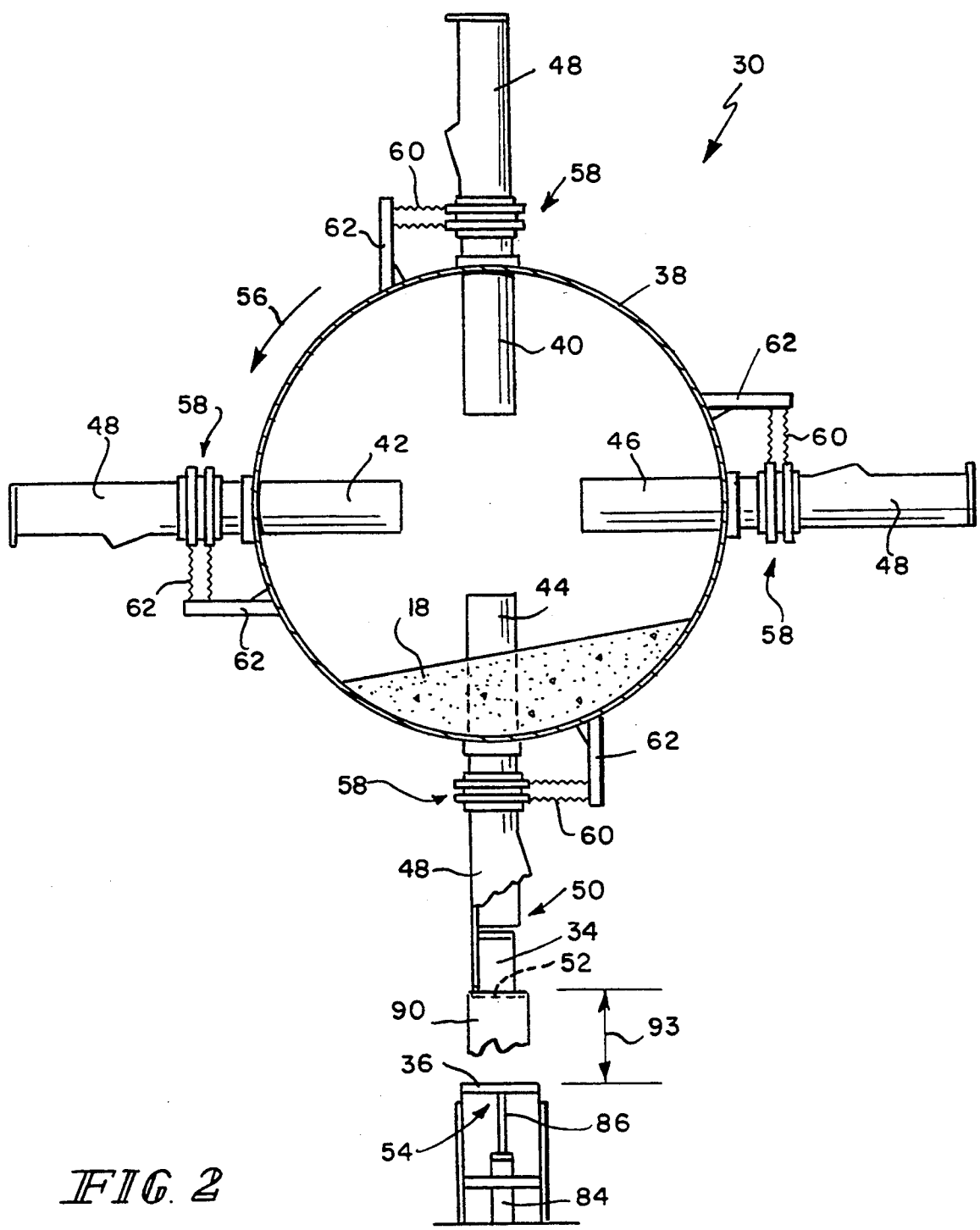
FIG. 2 is a sectional view taken along lines 2—2 of FIG. 1, with portions broken away illustrating details of the charging apparatus of the present invention.

The details of fuel charging apparatus 30 are illustrated in FIGS. 2–6. As illustrated in FIG. 2, charging apparatus 30 includes a cylindrical outer wall 38 and four drop tubes 40, 42, 44 and 46 coupled to four separate ports formed in cylinder outer wall 38. Charging apparatus 30 can be shipped to a kiln site and installed into kiln 10 in the manner similar to a normal change out of a kiln section that has been warped due to heat. The thickness of cylinder wall 38 of charging apparatus 30 is preferably about ¼ inch larger than the thickness of the kiln section that charging apparatus 30 replaces. Charging apparatus 30 can be fabricated and shipped in its entirety to the kiln site. Providing a pre-built charging apparatus 30 reduces the amount of kiln down time required to install charging apparatus 30. The provision of charging apparatus. 30 also eliminates the need to cut port holes in an existing kiln 10.

An inlet transfer tube 48 is coupled to outer wall 38 of charging apparatus 30 in communication with each of the four drop tubes 40, 42, 44 and 46. Each transfer tube 48 is formed to include an inlet opening 50 for receiving containers 34 therein and a bottom surface 52 for supporting containers 34. Containers 34 are selectively lifted from conveyor 36 by elevator assembly 54 as discussed in detail below. The lifted containers 34 are picked up by transfer tubes 48 as the kiln 10 rotates in the direction of arrow 56 and subsequently charged into kiln 10.

Advantageously, charging assembly 30 is loaded with containers 34 from a location beneath cylinder 12 of kiln 10 when transfer tubes 48 are at about bottom dead center. Therefore, containers 34 can be loaded from a lower elevation than from other conventional transfer assemblies. Conventional kiln charging apparatus such as the charging apparatus illustrated in U.S. Pat. No. 5,078,594 are loaded from a side of the kiln cylinder. Therefore, the modules or containers must be moved to a higher elevation before the containers are charged into the kiln.

Each transfer tube 48 includes a valve assembly 58 for selectively opening transfer tube 48 to charge the modules 34 into kiln 10 through the respective ports and drop tubes 40, 42, 44 and 46. Valve assemblies 58 are held in a normally closed position by springs 60 coupled to posts 62.

As illustrated in FIGS. 1 and 3, drop tubes 40 and 42 are longitudinally offset from drop tubes 44 and 46. Providing longitudinally offset drop tubes reduces the likelihood that containers 34 which are charged through the drop tubes 40, 42, 44 and 46 will strike a diametrically opposed drop tube upon entry of the fuel module 34 into the kiln.

Because drop tubes 40 and 42 are longitudinally offset from drop tubes 44 and 46, the transfer tubes 48 coupled to drop tubes 40 and 42 are also longitudinally offset from the transfer tubes 48 coupled to drop tubes 44 and 46. Therefore, two cam actuators 64 and 66 illustrated in FIG. 3 are required for opening the valves 58 of transfer tubes 48. Each valve 58 includes a closure plate 68 cooperating with a lever 70. Closure plates 68 are biased to normally closed positions by springs 60. Levers 70 engage a selected cam actuator 64 or 66 as the kiln cylinder 12 rotates to move closure plates 68 to an open position to charge containers 34 into kiln 10.

Cam actuators 64 and 66 each include a bell crank 72, a cam 74 coupled to a first end of bell crank 72, and an air cylinder 76 coupled to a second end of bell crank 72. Air cylinders 76 control movement of bell crank 72 to selectively move cams 74 into position for engaging levers 70 of valves 58. When cams 74 engage levers 70, closure plates 68 move to open valve 58 of transfer tube 48 to drop containers 34 into kiln cylinder as the transfer tube 48 moves past top dead center. FIG. 3 illustrates cam actuator 64 in an energized position so that cam 74 will strike lever 70 of the next valve assembly 58 that moves past cam 74 as kiln cylinder 12 rotates to open closure plate 68 and drop a container 34 into kiln cylinder 12. Cam actuator 66 is illustrated in a de-energized position so that valve 58 of transfer tube 48 coupled to drop tube 40 is not opened as the transfer tube 48 passes top dead center. This prevents undesired entry of ambient air into kiln 10 when no container 34 is in transfer tube 48. The dotted position of cam 74 illustrates cam actuator 66 in and energized position to engage lever 70. The cam actuator is further hinged to allow valve actuation in one direction. This is particularly useful at kiln shut down to accommodate potential kiln rollback when coming to a complete stop under actuator mechanical failure.

Details of cam actuator 64 are illustrated in FIG. 4. A piston rod 77 of air cylinder 76 is coupled to the second end of bell crank 72. Cam actuator 64 is in its energized position to engage levers 70 of transfer tubes 48 when the piston rod 77 is in its extended position as illustrated in FIG. 4. When piston rod 77 is moved to its retracted position, bell crank 72 moves to the dotted position 72 to de-energize cam actuator 64 and move cam 74 out of the path of levers 70. It is understood that cam actuator 66 operates in a manner identical to cam actuator 64.

Containers 34 are selectively loaded into transfer tubes 48 as kiln cylinder 12 rotates as discussed below in detail. Therefore, transfer tubes 48 may pass transfer assembly 38 without a container being loaded into transfer tube 48. When an empty transfer tube 48 passes above top dead center, the respective cam actuator 64 or 66 is de-energized so that cams 74 do not open valves 58. Therefore, valves 58 remain closed to block flow of ambient air through transfer tubes 48 when no container 34 are in transfer tubes 48.

Transfer assembly 38 is illustrated in detail in FIG. 5. Transfer assembly 38 includes a first container elevator 80 and a second container elevator 82. Elevator 80 is used to lift containers 34 upwardly from conveyor 36 to be picked up by transfer tubes 48 coupled to drop tubes 44 and 46. Second elevator 82 lifts containers 34 off conveyor 36 to be picked up by transfer tubes 48 coupled to drop tubes 40 and 42. Both elevator assemblies 80 and 82 include an air cylinder 84 which moves a piston rod 86 back and forth in the direction of double-headed arrow 88. Piston rod 86 is coupled to a pair of spaced apart, parallel plates 90 configured to lift containers 34 upwardly off transfer conveyor 36 in the direction of arrow 92. FIG. 6 illustrates the position of parallel plates 90 against a bottom surface of containers 34. The spaced apart vertical plates 90 provide a stable platform for lifting containers 34 into transfer in the direction of arrow 92 away from conveyor 36 to load the containers 34 into transfer tubes 48.

FIG. 5 illustrates elevator 80 in its extended position to lift container 34 upwardly so that container 34 is loaded into inlet tube 48 as kiln cylinder 12 rotates. As inlet tube 48 moves past parallel plates 90, container 34 enters aperture 50 in transfer tube 48. Parallel plates 90 extend above bottom surface 52 of transfer tube 48 so that the bottom of container 34 does not strike bottom surface 52 of inlet tube 48. Transfer tube 48 includes a notched section 94 which provides clearance for parallel plates 90. Therefore, as kiln cylinder 12 rotates transfer tube 48 picks up container 34 as transfer tube moves past elevated plates 90. Containers 34 are picked up as transfer tubes 48 move past bottom dead center. Containers 34 remain in transfer tubes 48 until transfer tubes 48 reach top dead center. At substantially top dead center, cam actuators 64 or 66 open valves to charge containers into kiln 10.

The firing system of the present invention selects an optimum firing interval for each container 34 as discussed below in detail. Therefore, a container 34 is typically not charged into each transfer tube 48 during each revolution of kiln cylinder 12. Clearance is provided between bottom surface 52 of transfer tubes 48 and a top of the containers 34 located on transfer conveyor 36. Therefore, unless elevators 80 or 82 are activated to lift containers 34 off transfer conveyor 36, the transfer tubes 48 will pass over containers 34 on transfer conveyor 36. Transfer assembly 38 includes means for aligning containers 34 with a selected elevator 80 or 82 so that the containers 34 can be loaded into an appropriate transfer tube 48.

A fixed container stop 96 is provided for aligning containers 34 with parallel plates 90 of elevator assembly 80. A movable container stop 98 controlled by air cylinder 100 is provided for selectively aligning a container 34 with parallel plates 90 of elevator 82. Container stop 98 can be retracted by cylinder 100 to permit a container 34 to move beyond container stop 98 to container stop 96 to be lifted by elevator assembly 80.

A second movable container stop 102 is provided upstream from container stop 98 to control entry of containers 34 to elevator assemblies 80 and 82. Movement of container stop 102 is controlled by air cylinder 104. By controlling the position of containers 34 above elevator assemblies 80 and 82, and by controlling the timing for lifting buckets 34 on elevator assemblies 80 and 82, the present invention can control the time that containers 34 are charged into kiln 10 in a step-wise manner. The charging apparatus 30 of the present invention permits up to four containers 34 to be charged into kiln 10 at radially spaced apart locations during each revolution of the kiln 10.

As discussed in detail below and illustrated diagrammatically in FIG. 3, operation of transfer assembly 38 and cam actuators 64 and 66 is controlled by a computer 105. Specifically, computer 105 controls actuation of air cylinders 84 of elevators 80 and 82, as well as movement of container stops 98 and 102 by air cylinders 100 and 104, respectively. Therefore, computer 105 controls the time that containers 34 are charged into kiln 10 to maintain the amount of a parameter of interest charged into kiln 10 at substantially a predetermined level. In addition, the computer 105 controls movement of piston rods 77 of air cylinders 76 to energize and de-energize cam actuators 64 and 66. A pair of infrared sensors 79 are provided to detect fuel delivery, confirm module entry, and signal that the next fuel container may be loaded into transfer tube 48.

It is understood that other arrangements of the drop tubes and transfer tubes may be provided. For example, the drop tubes may be aligned at substantially the same axial position along the longitudinal axis of outer wall 38. In this instance, a deflector plate may be coupled to each drop tube to deflect fuel modules entering kiln cylinder 12 through the drop tube along the longitudinal axis of kiln cylinder 12. Therefore, modules 34 entering the drop tubes will not strike a drop tube located below the drop tube through which the module is charged. In addition, the number of drop tubes may be increased or decreased depending upon the desired application.

The firing control system of the present invention is designed to achieve improved control of selected firing parameters to provide smoother firing of kiln 10. In addition, the firing system of the present invention is designed to increase capacity capabilities for firing solid waste derived fuel into kiln 10.

The firing control system of the present invention is designed to maintain the total amount of heat energy of solid waste charged into kiln 10 at approximately a preprogrammed demand level. The kiln operator can program in the desired level of heat energy to be charged into kiln 10 and the firing system automatically adjusts the firing interval of fuel modules to maintain the supplied heat energy at substantially the desired level. The firing system of the present invention also monitors the amount of other parameters of interest charged into the kiln 10.

The firing system of the present invention separates incoming containers 34 into various stages depending upon the amount of the parameter of interest within each container and then controls selection of containers from the various stages for charging into the kiln in a preselected order to maintain the amount of the parameter of interest charged into the kiln at substantially a preselected level. The firing system maintains the amount of regulatory driven parameters charged into the kiln below a preset regulatory limits while improving the firing efficiency of kiln 10.

As illustrated in FIG. 7, a staging assembly 106 is provided to separate incoming containers 34 onto a plurality of separate staging conveyors based upon the amount of a parameter of interest within each container 34. Palletized loads of containers 34 are received at a loading station 108. The solid waste derived fuel within each container 34 is sampled and the containers 34 are labeled with adhesive backed bar codes indicating the amount of the parameter of interest contained in each container 34. Each container 34 is also labeled with a heat energy (specific heat capacity) or BTU content. Preferably, the amount of the parameter of interest and number of BTUs per pound of solid waste are entered into a bar code and placed on each container 34. It is understood that any number of selected parameters can be coded onto the containers using bar code. Examples of combustion driven parameters which can be coded on the containers include chloride content, volatility, particle size, iron content, and total inorganic residue content. Examples of regulatory parameters which may be coded onto containers 34 include cadmium, lead, arsenic, chromium, barium and mercury.

Containers 34 are loaded from loading station 108 onto an input conveyor 110. The parameter values coded onto containers 34 are read by a bar code reader 112. Parameters values for each container are stored in a memory register of computer 105. Computer 105 includes a memory, a central processing unit, and input and output ports. Computer 105 controls operation of staging assembly 106 to sort containers 34 into various stages based upon the amount of the selected parameter of interest within each container 34. An operator programs the maximum average amount of the parameter of interest which can be charged into kiln 10 into the computer. Based upon this maximum average amount and upon the range of parameter amounts in the containers, staging assembly 106 and computer control 105 separate incoming containers 34 to a low parameter value conveyor 114, a hold point value conveyor 116 or a high parameter value conveyor 118.

Gates 120, 122, and 124 are provided to deflect containers 34 moving on input conveyor 110 selectively onto low stage conveyor 114, hold point stage conveyor 116, or high stage conveyor 118. In addition, a control storage conveyor 126 is provided for storing containers 34 which included a de minimis value of the selected parameter of interest. In other words, the amount of the selected parameter in Containers 34 on control storage stage conveyor 126 is substantially equal to zero. A gate 128 is provided to deflect containers 34 having substantially none of the selected parameter onto control storage stage conveyor 126. Computer control 105 controls movement of gates 120, 122, 124, and 128 to deflect incoming containers from input conveyor 110 into the appropriate staging conveyor.

For example, if lead is selected as a parameter of interest, the maximum average amount of lead which may be charged into kiln 10 is entered into computer 105. Illustratively, this example will assume that 30 pounds of lead can be charged into kiln 10 per hour and that about 90 containers 34 are charged into kiln 10 each hour. Therefore, containers 34 must average no more than 0.333 pounds of lead per container. If, for example, the amount of lead in containers 34 varies from 0.200 to 0.500 pounds per container, containers 34 may be sorted onto the three staging conveyors 114, 116 and 118 illustrated in FIG. 7 based on the amount of lead in containers 34. Low stage conveyor 114 receives containers 34 having lead values between 0.200–0.300 pounds per container. Hold point stage conveyor 116 receives containers 34 having a lead value between 0.301–0.400 pounds per container. High stage conveyor 118 will receive containers having lead values between 0.401–0.500 lbs. per container. Control storage stage conveyor 126 will receive any containers 34 which include substantially no lead. The selected ranges of parameter amounts on each staging conveyor can vary depending on the range of the parameter amounts in the container.

Figure 8:
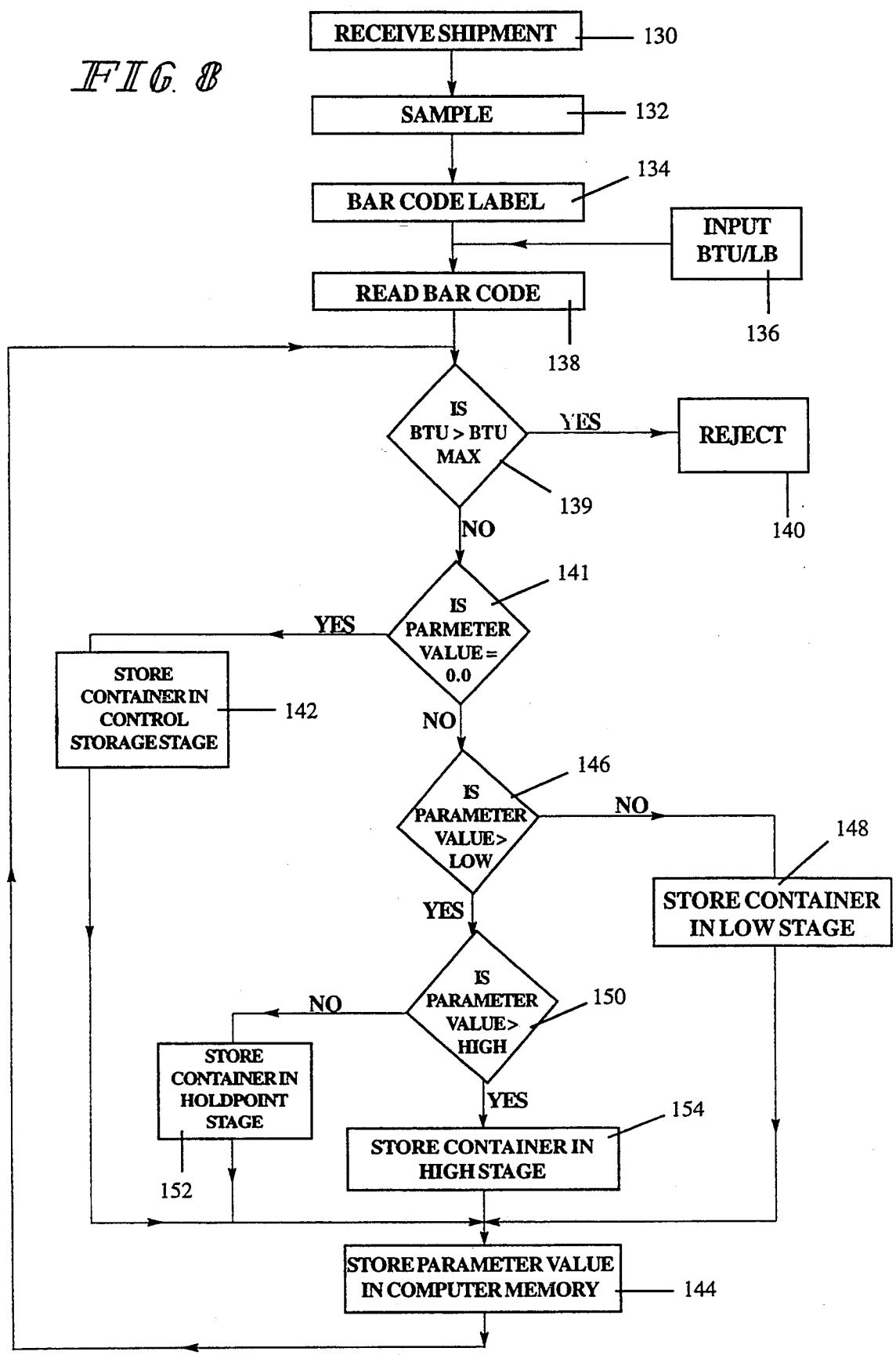
FIG. 8 is a flow chart illustrating the steps performed by the firing control system for staging incoming containers based upon the amount of a parameter of interest in each container.

A flow chart illustrating the steps performed by the computer 105 to sort incoming containers 34 is illustrated in FIG. 8. After the shipment of containers 34 is received as illustrated at block 130 and sampled as illustrated at block 132, a bar code label containing parameter values is placed on each container 34 as illustrated at block 134. As discussed above, the heat energy or BTU content in each container is also coded onto each container 34 at block 136. The BTU content can be sampled for each container 34 or the entire batch of solid waste drive fuel may have a BTU content which is placed on each container 34. Bar code reader 112 reads the parameter information at block 138.

Computer 105 determines whether the BTU content of container 34 is above a preset maximum level at block 139. If the BTU content of container 34 is greater than the maximum BTU value, container 34 is rejected as illustrated at block 140. A rejected container is transported past all of the staging conveyors to a separate collection area and is not charged into the kiln.

If the BTU content of container 34 is below the maximum BTU level, computer 105 determines whether the parameter value is below a negligible or de minimis value at block 141. If the parameter value is below the de minimis value, computer 105 opens gate 128 to deflect container 34 into control storage stage conveyor 126 as illustrated at block 142. The parameter value for the container is then stored in the memory of computer 105 at block 144 and the BTU content for the next container is then analyzed by computer 105 at block 139.

If the parameter value is above the de minimis value at block 141, computer 105 next determines whether the parameter value in the container is greater than a predetermined low range value. In the example discussed above, computer 105 would determine whether the lead content of the container 34 is greater than 0.300 pounds per container. If the parameter value in container 34 is not greater than the low value at block 146, computer 105 opens gate 120 to deflect the container into low stage conveyor 114 as illustrated at block 148. The parameter value for container 34 is then stored in the computer memory at block 144.

If the parameter value is greater than the low value at block 146, computer 105 next determines whether the parameter value is greater than a selected high value at block 150. This high value is illustratively the lowest value in the range of parameter values for storage on high stage conveyor 118. Therefore, if the parameter value for the container is not greater than the high value at block 150, computer 105 generates a control signal to open gate 122 and deflect the container into the hold point stage conveyor 116 as illustrated at block 152.

If the parameter value in the container is greater than the high parameter value at block 150, computer 105 generates a control signal to open gate 124 and deflect the container onto high stage conveyor 118 as illustrated at block 154. The parameter value in the container is then stored in computer memory at block 144. The parameter value is then stored at block 144. If the parameter amount in the container 34 exceeds a maximum amount, it is possible to permit the container 34 to move past high stage conveyor 118 on inlet conveyor 110 to a separate collection area (not shown) as containers 34 are rejected.

It is understood that additional decision blocks such as blocks 141, 146, and 150 may be provided if additional staging conveyors are provided in staging assembly 106. Additional staging conveyors 153 and 155 may be included to divide incoming conveyors into additional stages, thereby increasing the accuracy of the firing system.

Once the incoming containers 34 have been sorted into the various staging conveyors, the containers 34 are ready to be arranged in a selected order for charging into kiln 10. Containers 34 are selected from the various staging conveyors 114, 116 and 118 in a selected manner to maintain the average amount of the parameter of interest substantially equal to the preset value. Computer 105 controls the removal of containers 34 from staging conveyors 114, 116 and 118. Computer 105 ensures that the maximum average parameter of value for the containers 34 does not exceed at regulatory limits.

Computer 105 controls the movement of containers 34 from the staging assembly 106 onto transfer conveyor 36 in the selected order. Specifically, computer 105 controls operation of gates 156, 158, 159, and 160 to control movement of containers 34 from staging assembly 106 onto transfer conveyor 36. It is understood that other container stops may be used in addition to or in place of gates 156, 158, 159 and 160. By selectively loading containers from low stage conveyor 114, hold point stage conveyor 116, high stage conveyor 118 and control storage stage conveyor 126 onto transfer conveyor 36, the computer 105 of the present invention can control the average parameter amount in containers 34 being charged into kiln 10.

Figure 9:
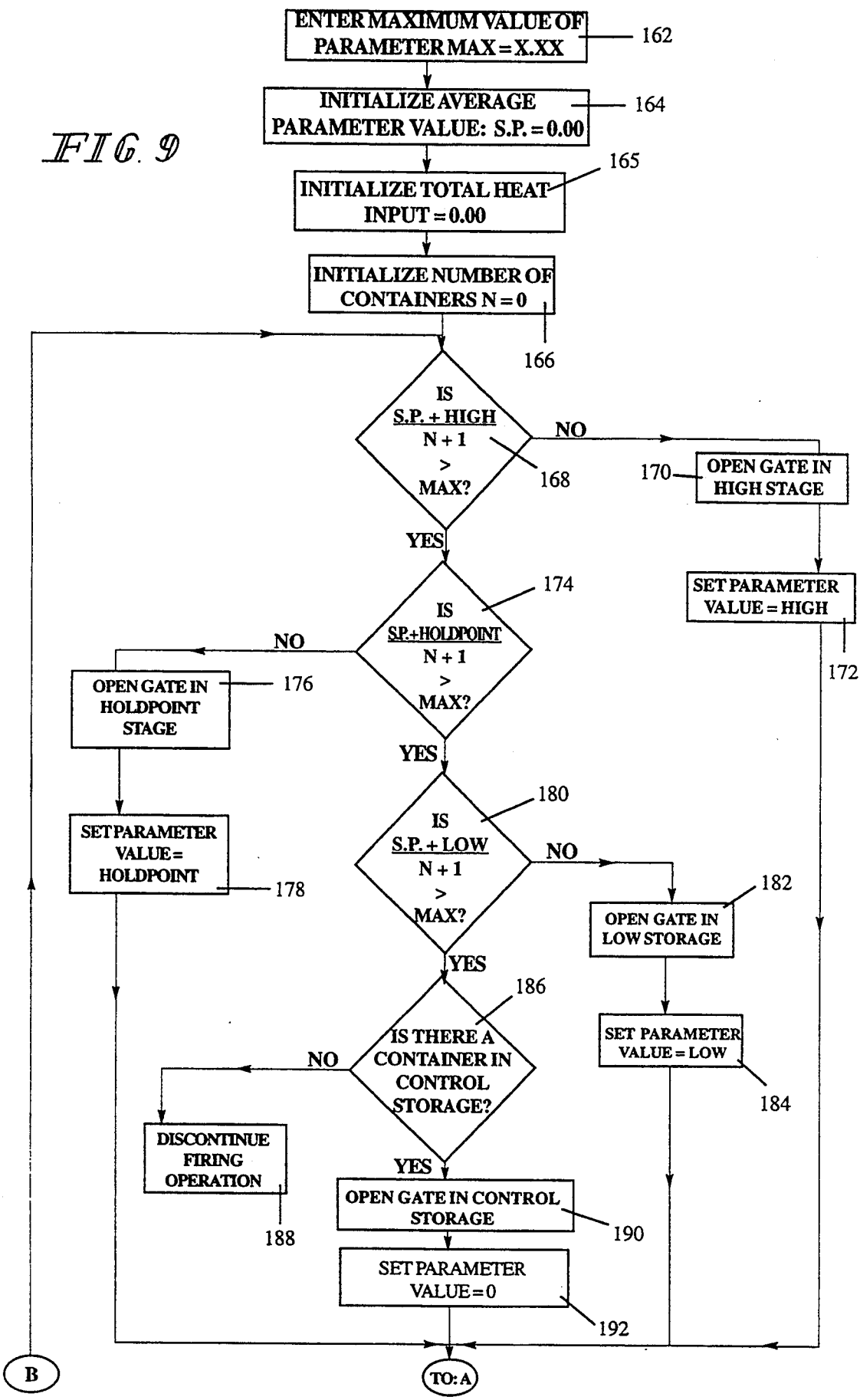
FIGS. 9 and 10 are flow charts illustrating the steps performed by the firing system for selecting containers from the staging assembly, loading the selected containers onto the transfer conveyor in a predetermined order for charging the containers into the kiln, and calculating an optimum time to charge the containers into the kiln.
Figure 10:
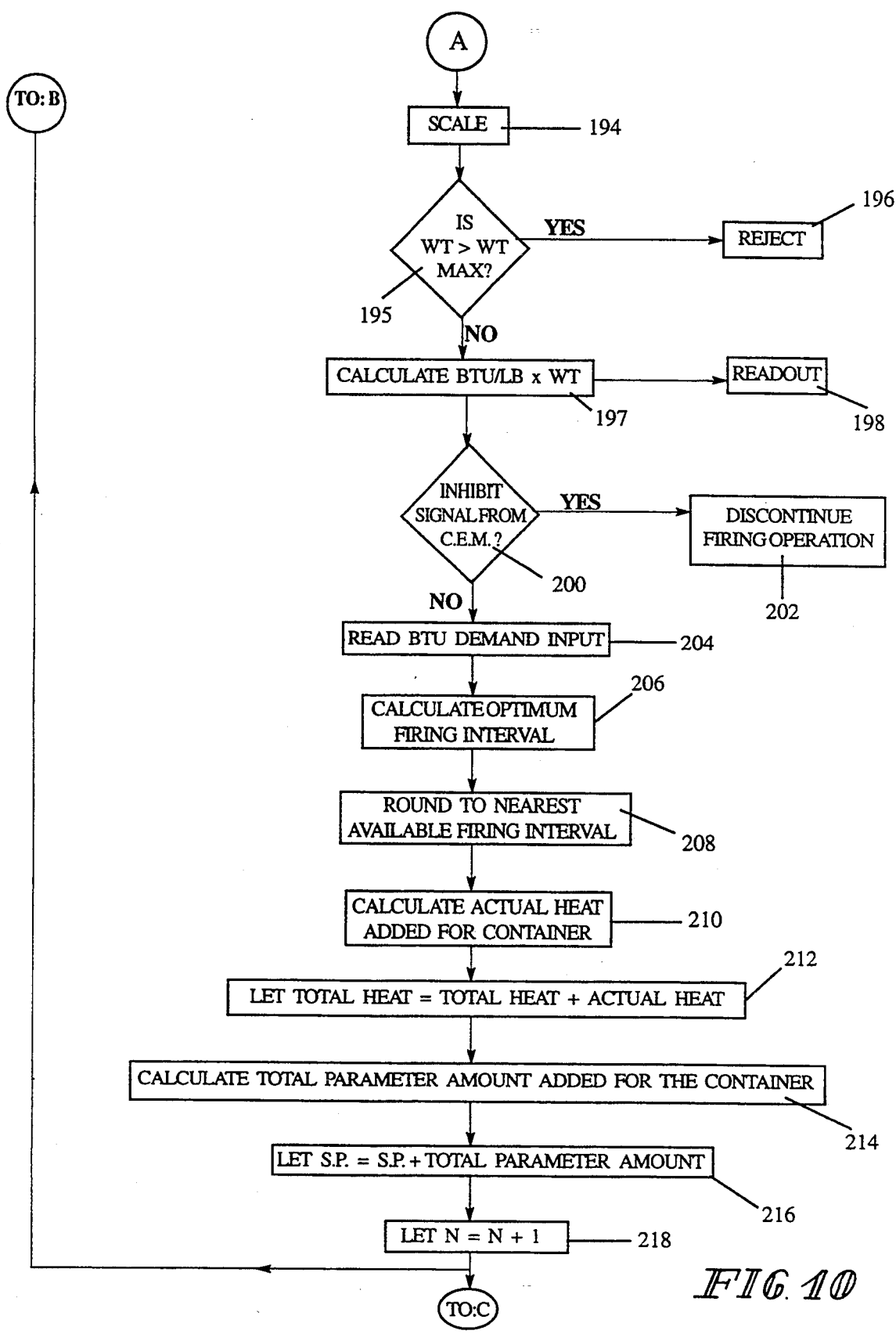
Figure 11:
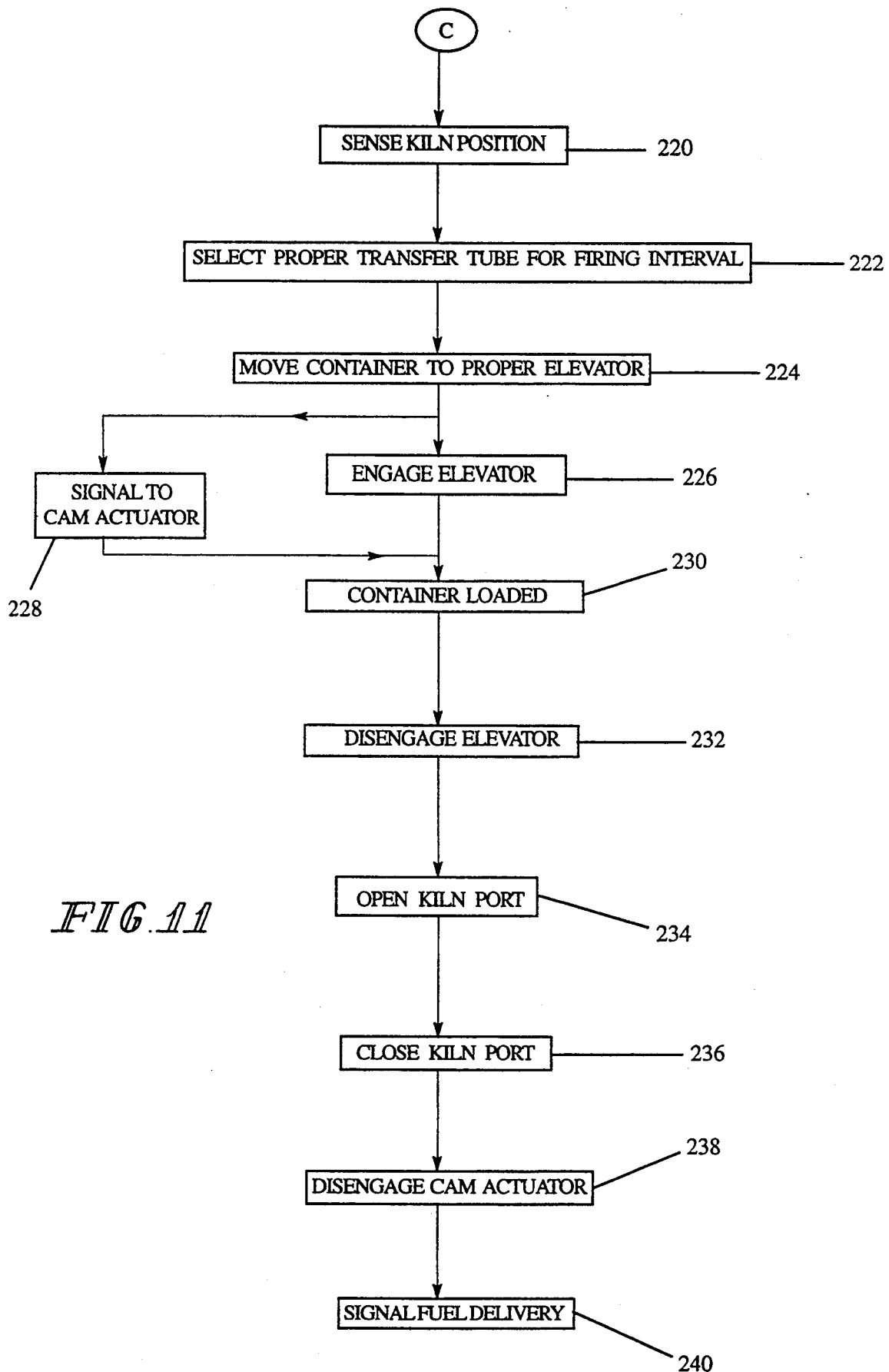
FIG. 11 is a flow chart illustrating additional steps performed by the firing system for charging the containers into the kiln.

FIGS. 9 and 10 illustrate a flow chart of the steps performed by computer 105 for transferring containers 34 from staging assembly 106 to transfer conveyor 36 of transfer assembly 38. The maximum allowed average amount of the parameter of interest is programmed into computer 105 by an operator as illustrated at block 162. The maximum amount may be a combustion driven maximum amount or a regulatory driven maximum amount. Computer 105 then sets the actual average parameter value set point (S.P.) to 0.00 at block 164, initializes the total heat energy value input into kiln 10 to zero at block 165, and initializes the total number of containers to zero at block 166. Operation of the control loop for controlling movement of containers 34 from staging assembly 106 onto transfer conveyor 36 is illustrated in blocks 168–218 of FIGS. 9 and 10.

Computer 105 continuously updates the running average of the parameter amount for all the containers after each container 34 is charged into kiln 10 so that the total parameter amount charged into kiln 10 does not exceed the maximum permitted average parameter amount entered at block 162. Using the parameter values stored in computer memory for each container 34, computer 105 calculates the average parameter amount of all of the containers 34 loaded onto transfer conveyor 36.

To select which container 34 to load onto transfer conveyor 36, computer 105 calculates a new average using the previous total average combined with the stored parameter amount of the first available container on high stage conveyor 118 to determine whether this new average is greater than the maximum permitted parameter amount at block 168. If the calculated average using the first available container 34 on high stage conveyor 118 is not greater than the maximum permitted parameter amount, computer 105 generates a control signal to open gate 158 of high stage conveyor 118 to permit the first available container 34 on high stage conveyor 118 to move onto transfer conveyor 116 as illustrated at block 170. Computer 105 then sets the parameter amount for the loaded container 34 equal to the stored parameter amount corresponding to the first available container in the high stage conveyor 118 which was loaded onto transfer conveyor 36 as illustrated at block 172.

If the new average parameter amount calculated using the first available container 34 on high stage conveyor 118 is greater than the maximum permitted parameter amount, computer 105 calculates a new average using the average parameter amount from all previously removed containers 34 and the parameter amount of the first available container 34 on hold point stage conveyor 116. If this new average is not greater than the maximum permitted amount, computer 105 generates a control signal to open gate 159 and permit the first available container 34 on hold point stage conveyor 116 to move onto transfer conveyor 36 as illustrated at block 176. Computer 105 then sets the parameter amount for the loaded container 34 equal to the stored parameter amount corresponding to the first available container on the hold point conveyor 116 which was just loaded onto transfer conveyer 36 as illustrated at block 178.

If the new average calculated using the parameter value of the first available container 34 on hold point stage conveyor 116 is greater than the maximum permitted value at block 174, computer 105 calculates a new average using the average parameter value from all previous containers 34 and the parameter value of the first available container on the low storage stage conveyor 114 at block 180. Computer 105 compares this new average to the maximum allowed amount of the parameter. If this average is not above the maximum permitted average amount, computer 105 generates a control signal to open gate 160 to permit the first available container on low stage conveyor 114 to move onto transfer conveyor 36 as illustrated at block 182. Computer 105 then sets the parameter amount for the loaded container equal to the stored parameter value corresponding to the container loaded onto transfer conveyor 36 from low stage conveyor 114 at block 184.

If the new average value computed at block 180 is greater than the maximum amount, computer 105 determines whether a container 34 is available on control storage stage conveyor 126. Containers on control storage stage conveyor 126 do not contain any statistically significant amounts of the parameter of interest and can therefore be charged into kiln 10 without increasing the total amount of the parameter of interest. If there are no containers available on control storage stage conveyor 126, computer 105 generates a control signal to discontinue the firing operation at block 188. This prevents the total amount of the parameter charged into kiln 10 from exceeding the preselected maximum amount. If a container is available on control storage stage conveyor 126, computer 105 generates a control signal to open gate 156 and permit the first available container on control storage stage conveyor 126 to move onto transfer conveyor 36 as illustrated at block 190. The parameter value is set to zero (or to the value substantially equal to zero) at block 192.

The flow chart of FIG. 9 illustrates the steps performed by the apparatus for removing fuel modules or containers from the plurality of staging conveyors 114, 116, 118 and 126 in a selected order to maintain an average parameter amount for containers charged into the kiln at substantially a preselected level. After the containers 34 are organized on transfer conveyor 36 in the selected order, containers 34 are ready to be charged into kiln 10. FIG. 10 illustrates the steps for determining an optimum firing interval for charging containers 34 moving on transfer conveyor 36 into kiln 10.

Containers 34 entering transfer conveyor 36 from staging assembly 106 pass over a scale 193 illustrated in FIG. 7. Scale 193 is located in close proximity to transfer assembly 38. This step is illustrated at block 194 in FIG. 10. Scale 193 calculates the weight of each container 34 moving over scale 193. Computer 105 determines at block 195 whether the weight of the container is above a preset maximum weight. If the weight of a container 34 is above the present maximum, the container is rejected at block 196. As illustrated in FIG. 7, a rejected container 34 is diverted onto storage conveyor 199 by a reject kicker such as air cylinder 201. Containers 34 on conveyor 199 are not charged into the kiln.

Because the computer rejects containers having a BTU content which exceeds the preset maximum BTU content as illustrated at blocks 139 and 140 and because computer 105 rejects containers having a weight which exceeds a maximum weight as illustrated at blocks 195 and 196, the firing control system of the present invention enhances controlled firing of the kiln by checking and maintaining the total heat energy (BTU content) below a preselected level. Therefore, highly combustible (high BTU) materials are screened out or rejected and are not charged into kiln 10. This improves firing consistency and reduces carbon monoxide emissions by reducing the amount of incomplete combustion of containers 34 within containers 34. Incomplete combustion can occur when high BTU materials are charged into kiln 10. Incomplete combustion results in the production of carbon monoxide.

If the weight of the container measured by scale 193 is not above the maximum weight, computer uses the weight of the container to calculate the total heat energy or BTU value of the container 34 using the weight measured by scale 193 and the specific heat capacity or amount of BTUs per pound stored in computer memory for the particular container 34 as illustrated at block 196. A continuous read out of the BTU value is generated at block 198.

Computer 105 determines at block 200 whether an inhibit signal has been received from the continuous emissions monitoring system 28 illustrated in FIG. 1. The inhibit signal is generated if the amount of the parameter of interest or other parameters discharged into the atmosphere exceeds regulatory limits. If the inhibit signal has been received from continuous emissions monitoring system 28, computer 105 generates a control signal to discontinue the firing operation of the kiln at block 202.

If the inhibit signal has not been received, computer 105 reads the desired heat energy or BTU demand value. The desired BTU value was input by a controller at block 204. Computer 105 then calculates an optimum time to charge each container 34 into kiln 10 based upon the total number of BTUs in the container 34 and the desired BTU demand as illustrated at block 206.

Computer 105 uses the following equation to calculate an optimum firing interval for each container 34:

$$F.I. = \frac{\text{Weight} \times S.H.C. \times 3600}{[(\text{Demand} \times (N + 1)) - \text{Total Heat}]}$$

Total Heat = Total heat added for all containers previously fired into kiln in BTUs/Hour After the optimum firing interval is calculated by computer 105, computer 105 must then determine which of the transfer tubes 48 should be loaded with the specific container 34. Because kiln cylinder 12 moves at a constant rate, containers 34 can only be charged into kiln cylinder 12 at preset intervals determined by the rate of rotation of the kiln. Since it is likely that container 34 cannot be charged into kiln cylinder 12 at exactly the optimum time calculated, computer 105 must round the firing interval to the nearest available firing interval at block 208.

The number of revolutions per hour of kiln 10 is real time sensed and input into the computer for calculation. Therefore, computer 105 can calculate the total number of containers 34 which can be charged into kiln 10 per hour. An example of a firing table is illustrated in FIG. 12. The FIG. 12 firing table is calculated for a kiln 10 which rotates 90 revolutions per hour. The firing table of FIG. 12 is calculated assuming that the average weight of each container is 65 pounds and the average specific heat capacity is 6,000 BTUs per pound. Therefore, for charging apparatus 30 illustrated in FIGS. 1-3, 360 containers may be charged into kiln 10 every hour if kiln cylinder 12 is rotating at 90 revolutions per hour, since four transfer tubes 48 are provided around the periphery of cylinder 12. Therefore, when kiln 10 is rotating at 90 revolutions per hour, a container 34 can be charged into the kiln every ten seconds. As the speed of rotation varies, the possible firing intervals will also change.

After computer 105 calculates the optimum firing interval for each container 34, the calculated firing interval is rounded to the closest available firing interval at block 208. For a kiln rotating at 90 revolutions per hour, the calculated firing interval is rounded to the closest ten second interval.

Computer 105 then calculates the actual heat energy input into kiln 10 for the container at block 210 using the actual firing interval of container 34 according to the following formula:

$$\text{ACTUAL HEAT (BTUs/Hour)} = \frac{\text{Weight} \times S.H.C. \times 3600}{\text{ACTUAL F.I. (sec)}}$$

Computer 105 then resets the total heat added to kiln 10 to the value equal to the total heat from previous containers plus the actual heat input from the last container as illustrated at block 212.

Computer 105 then calculates the total amount of the parameter of interest added for the particular container based upon the actual firing interval at block 214. Computer 105 then resets the cumulative set point (S.P.) indicating the total average amount of the parameter of interest charged into kiln 10 as the existing set point plus the total parameter added to kiln 10 from container 34 which was just loaded onto transfer conveyor 106 from staging assembly 106 as illustrated at block 216. Computer 105 then increases the total number of containers (N) by 1 at block 218.

The control loop then returns to analyze which of the next available containers 34 from staging assembly 106 should be loaded next onto transfer conveyor 36. Computer 105 also continues control over the kiln firing. Sensors (not shown) on charging apparatus 30 indicate the position of the kiln 10 and generate a reference signal. By sensing the kiln position at block 220, computer 105 selects at block 222 which of the four transfer tubes 48 will be used for charging container 34 based on the optimal actual firing interval calculated above at block 208. After the proper transfer tube 48 is selected, computer controls air cylinders 100 and 104 to move container stops 98 and 102, respectively. Therefore, computer 105 controls whether the container 34 is positioned over first elevator 80 or second elevator 82 at block 224. After appropriately positioning each container 34 over the appropriate elevator 80 or 82 at block 224, computer 105 generates a control signal to control the appropriate air cylinder 84 to lift container 34 upwardly in the direction of arrow 92 so that the selected transfer tube 48 picks up the container 34. This step is indicated at block 226. Computer 105 also generates a control signal at block 228 to engage the appropriate cam actuator 64 or 66 at an appropriate time to deflect lever 70 and move closure plate 68 so that the container in transfer tube 48 is charged into kiln 10.

The selected transfer tube 48 picks up container 34 as kiln cylinder 12 rotates to move the transfer tube 48 past the appropriate elevator 80 or 82. After container 34 is picked up by transfer tube 48, computer 105 generates a control signal to disengage the elevator at block 232. The appropriate cam actuator moves into the path of lever-70 at an appropriate time to open kiln port as illustrated at block 234. Therefore, container 34 is charged through valve 58 of transfer tube 48 and into kiln cylinder 12. After lever 70 moves past cam actuator 64 or 66, springs 60 automatically close valve 58 of transfer tube 48 to prevent flow ambient air into kiln cylinder 12 as illustrated at block 236. Computer 105 then generates a control signal to disengage cam actuator 238 and fuel delivery is signalled by sensors 79 at block 240.

By controlling selection of containers from staging assembly 106 and by calculating the optimum firing interval for the selected containers, the firing system of the present invention increases efficiency by maintaining the heat energy level added to kiln 10 at substantially a desired level. In addition, the firing system monitors the total amount of a parameter of interest input into kiln 10. Therefore, the firing system can maintain the amount of parameter of interest added to the kiln 10 below a predetermined level in order to comply with combustion or regulatory limits.

In another embodiment of the present invention, a transfer assembly such as the transfer assembly disclosed in U.S. Pat. No. 5,078,594, incorporated herein by reference, may be substituted for the transfer assembly illustrated is FIGS. 1-6. Particularly, inlet tubes 48 can be modified so that the tubes can pick up tires or other solid waste in a manner disclosed in the '594 patent. The size of the port disclosed in the '594 patent may be modified to accept containerized waste. Preferably, such solid waste would be loaded into the kiln from a staging assembly located along one side of the kiln.

One or more of the transfer assemblies disclosed in the '594 patent may be combined with one or more of the transfer tubes 48 disclosed in FIGS. 1-6. In this embodiment, a first staging assembly may be located beneath kiln 10 as illustrated in FIGS. 1-3 and 5. Another staging assembly may be located along the side of kiln 10 as illustrated in the '594 patent.

Computer control 105 may be used in the manner described above to control selectively the charging tires or other solid waste material into the first set of transfer assemblies while containerized waste is loaded from beneath the kiln in a manner similar to the manner disclosed in FIGS. 1-6. Therefore, the firing system of the present invention may be used to control the firing of both hazardous and nonhazardous solid waste materials into kiln 10, or a combination of both hazardous and nonhazardous solid waste into kiln cylinder 12.

It is understood that in the claims the term "fuel module" is intended to refer to any combustible solid waste. The combustible solid waste may be located in containers or bags, or may be charged directly into the kiln (for example tires, etc.). The solid waste may be hazardous or nonhazardous waste.

Although the invention has been described in detail with reference to a certain illustrated embodiment, variations and modifications exist within the scope and spirit of the invention as described and defined in the following claims.

What is claimed is:

1. A firing system for charging a plurality of incoming combustible fuel modules containing a known amount of a parameter of interest into a heated zone of a rotating kiln, the firing system comprising:
    means for separating incoming fuel modules into a plurality of stages based on the parameter amount in each fuel module;
    means for removing fuel modules from the plurality of stages in a selected order to maintain an average parameter amount for fuel modules charged into the kiln at substantially a preselected level; and
    means for charging fuel modules into the kiln in the selected order.

2. The firing system of claim 1, wherein incoming fuel modules are transported to the firing system on an inlet conveyor, and the separating means includes a plurality of staging conveyors and means for deflecting each incoming fuel module from the inlet conveyor onto a selected staging conveyor based on the parameter amount in each fuel module.

3. The firing system of claim 2, wherein the charging means includes a transfer conveyor for moving fuel modules from the plurality of staging conveyors toward the kiln and means for transferring fuel modules from the transfer conveyor into the kiln.

4. The firing system of claim 3, wherein the means for removing fuel modules from the plurality of stages includes a plurality of gates for blocking movement of fuel modules from the plurality of staging conveyors onto the transfer conveyor and means for selectively opening the gates to permit movement of fuel modules from the plurality of staging .conveyors onto the transfer conveyor in the selected order.

5. The firing system of claim 4, wherein the means for selectively opening the plurality of gates includes means for determining which of the next available fuel modules in each of the plurality of stages will provide an optimum parameter amount to maintain the average amount of the parameter of interest supplied to the kiln at substantially the preselected level.

6. A firing system for charging a plurality of incoming combustible fuel modules containing a known amount of a parameter of interest into a heated zone of a rotating kiln, the firing system comprising:
    means for labeling the amount of the parameter of interest on each of the incoming fuel modules;
    means for separating incoming fuel modules into a plurality of stages based on the parameter amount in each fuel module, the separating means including means for reading the amount of the parameter of interest contained in each fuel module, and means for loading each fuel module into an appropriate one of the plurality of stages based upon the parameter amount read by the reading means;
    means for removing fuel modules from the plurality of stages in a selected order to maintain an average parameter amount for fuel modules charged into the kiln at substantially a preselected level; and
    means for charging fuel modules into the kiln in the selected order.

7. The firing system of claim 6, further comprising means for storing the amount of the parameter of interest for each of the plurality of incoming fuel modules.

8. The firing system of claim 1, wherein the means for removing fuel modules from the plurality of stages in a selected order includes means for calculating which of the next available fuel modules from the plurality of stages provides an optimum parameter amount to maintain the average parameter amount charged into the kiln at substantially said preselected level.

9. The firing system of claim 8, wherein the calculating means includes means for separately calculating an average parameter amount in fuel modules previously removed by the removing means using the parameter amount in the next available fuel module from each of the plurality of stages separately, and means for comparing the calculated averages with the preselected level to select the next available fuel module from the stage that maintains the average parameter amount charged into the kiln closest to said preselected level.

10. The firing system of claim 1, further comprising means for discontinuing operation of the charging means if the average parameter amount exceeds said preselected level.

11. The firing system of claim 1, further comprising means for determining an optimum time to charge each fuel module into the rotating kiln to maintain the average amount of a second parameter of interest supplied to the kiln substantially at a second preselected level, the charging means charging each fuel module into the kiln at substantially said optimum time.

12. The firing system of claim 11, wherein the determining means includes means for calculating an optimum firing interval for a next available fuel module based upon the average second parameter amount in fuel modules previously charged into the kiln and the second parameter amount in the next available fuel module, the firing interval being selected to maintain the average second parameter amount at substantially said second preselected level.

13. The firing system of claim 11, wherein the charging means includes a generally cylindrical outer wall configured to replace a section of the rotating kiln, the cylindrical outer wall being formed to include at least two ports therein, the ports being spaced apart along a periphery of the outer wall, at least two drop tubes, one drop tube extending through each of the ports and into the heated zone of the rotating kiln so that fuel modules can be charged into the rotating kiln through the drop tubes at radially spaced apart locations of the cylindrical outer wall, the charging means also including means for selectively transferring fuel modules into a selected drop tube at substantially said optimum time to charge the fuel module into the kiln through the selected drop tube.

14. The firing system of claim 13, further comprising:
    a closure for each port, each closure being movable between an open position and a closed position;
    means for moving each closure selectively between the closed position and the open position to charge modules through the selected port and into the heated zone of the kiln; and
    means for controlling the entry of ambient air into the kiln through the ports, the controlling means being coupled to the moving means.

15. The firing system of claim 14, wherein the moving means includes a cam actuator movable from a first position to open the closure of a selected port as the drop tube coupled to the selected port passes the cam actuator during rotation of the kiln to a second position to permit the drop tube to pass the cam actuator without opening the closure, the controlling means moving the cam actuator to its first position when a fuel module is in a passing drop tube to charge the fuel module into the kiln, the controlling means moving the cam actuator to its second position when a passing drop tube is empty, thereby maintaining the closure in its closed position and preventing ambient air from entering the kiln.

16. The firing system of claim 13, wherein the transferring means includes an elevator assembly for lifting fuel modules upwardly into alignment with the selected drop tube.

17. The firing system of claim 1, further comprising means for calculating the total quantity of heat energy available in each fuel module, and means for determining an optimum time for charging each module into the kiln to maintain an average quantity of heat energy charged into the kiln at substantially a desired level, the charging means charging each fuel module into the kiln at said optimum time.

18. An apparatus for charging a plurality of combustible solid waste fuel modules containing a known amount of a parameter of interest into a heated zone of a rotating kiln, the apparatus comprising:
   means for storing the amount of the parameter of interest by weight of each fuel module;
   means for weighing each fuel module;
   means for calculating the amount of the parameter of interest in each fuel module using the stored amount of the parameter of interest in each fuel module and the measured weight of each fuel module;
   means for determining an optimum time to charge each fuel module into the rotating kiln to maintain an average amount of the parameter of interest supplied to the kiln substantially at a preselected level; and
   means for charging each fuel module into the kiln at substantially said optimum time.

19. The apparatus of claim 18, wherein the determining means includes means for calculating an optimum firing interval for a next available fuel module based upon an average parameter amount in fuel modules previously charged into the kiln and the parameter amount in the next available fuel module, the firing interval being selected to maintain the average parameter amount at substantially said preselected level.

20. The apparatus of claim 18, wherein the charging means includes a generally cylindrical outer wall configured to replace a section of the rotating kiln cylinder, the cylindrical outer wall being formed to include at least two ports therein, the ports being spaced apart along a periphery of the outer wall, at least two drop tubes, one drop tube extending through each port and into the heated zone of the rotating kiln so that fuel modules can be charged into the rotating kiln cylinder through the drop tubes at radially spaced apart locations of the kiln cylinder during each revolution of the kiln cylinder.

21. The apparatus of claim 20, wherein the determining means includes means for calculating an optimum firing interval for a next available fuel module, and means for selectively loading the next available fuel module into one of the drop tubes based upon said optimum firing interval.

22. The apparatus of claim 20, further comprising:
   a closure for each port, each closure being movable between an open position and a closed position;
   means for moving each closure selectively between the closed position and the open position to charge modules through the selected port and into the heated zone of the kiln; and
   means for controlling the entry of ambient air into the kiln through the ports, the controlling means being coupled to the moving means.

23. The apparatus of claim 22, wherein the moving means includes a cam actuator movable from a first position to open the closure of a selected port as the drop tube coupled to the selected port passes the cam actuator during rotation of the kiln to a second position to permit the drop tube to pass the cam actuator without opening the closure, the controlling means moving the cam actuator to its first position when a fuel module is in a passing drop tube to charge the fuel module into the kiln, the controlling means moving the cam actuator to its second position when a passing drop tube is empty, thereby maintaining the closure in its closed position and preventing ambient air from entering the kiln.

24. The apparatus of claim 18, further comprising means for separating incoming fuel modules into a plurality of stages based on an amount of a second parameter of interest in each fuel module, and means for removing fuel modules from the plurality of stages in a selected order to maintain an average second parameter amount for fuel modules charged into the kiln at substantially a second preselected level, the charging means charging fuel modules into the kiln in the selected order.

25. The apparatus of claim 24, wherein the means for removing fuel modules from the plurality of stages in a selected order includes means for calculating which of the next available fuel modules from the plurality of stages provides an optimum second parameter amount to maintain the average second parameter amount charged into the kiln at substantially said second preselected level.

26. The apparatus of claim 25, wherein the calculating means includes means for separately calculating an average second parameter amount in fuel modules previously removed by the removing means using the second parameter amount in the next available fuel module from each of the plurality of stages, and means for comparing the calculated averages with the second preselected level to select the next available fuel module from the stage that maintains the average second parameter amount charged into the kiln closest to said second preselected level.

27. The apparatus of claim 24, further comprising means for discontinuing operation of the charging means if the average second parameter amount exceeds said second preselected level.

28. The apparatus of claim 18, wherein the charging means includes a generally cylindrical outer wall configured to replace a section of the rotating kiln, the cylindrical outer wall being formed to include at least two ports therein, the ports being spaced apart along a periphery of the outer wall, at least two drop tubes, one drop tube extending through each of the ports and into the heated zone of the rotating kiln so that fuel modules can be charged into the rotating kiln through the drop tubes at radially spaced apart locations of the cylindrical outer wall, the charging means also including means for selectively transferring fuel modules into a selected drop tube at substantially said optimum time to charge the fuel module into the kiln through the selected drop tube.

29. The apparatus of claim 28, wherein the transferring means includes an elevator assembly for lifting fuel modules upwardly into alignment with the selected drop tube.

30. A method for charging a plurality of incoming fuel modules containing combustible material into a heated zone of a rotating kiln, the method comprising the steps of:
   separating the incoming fuel modules into a plurality of different stages based upon the amount of a parameter contained within each fuel module;
   removing fuel modules stored in the plurality of stages in a selected order to maintain an average amount of the parameter charged into the kiln at substantially a preselected level; and
   charging the selected modules into the kiln in the selected order.

31. The method of claim 30, further comprising the steps of:
   calculating the total quantity of heat energy available in each module; and
   selecting an optimum time for charging each module into the kiln to maintain the average quantity of heat energy charged into the kiln at substantially a desired level.

32. The method of claim 31, wherein the calculating step includes the step of weighing each fuel module prior to charging the fuel module into the kiln.

33. The method of claim 31, wherein the step of selecting an optimum time for charging each module into the kiln includes the step of comparing the heat energy available in each module to the desired heat energy level and calculating a firing interval based upon the comparing step.

34. The method of claim 30, wherein the separating step includes the steps of:
   reading the amount of the parameter of interest in each fuel module; and
   loading incoming fuel modules into a selected one of a plurality of stages based upon the amount of the parameter in each fuel module.

35. The method of claim 34, wherein the removing step includes the steps of:
   calculating which of the next available fuel modules from the plurality of stages provides an optimum parameter amount to maintain the average parameter amount at substantially said preselected level; and
   transferring the next available fuel module from the stage which provides the optimum parameter amount computed during the calculating step to the kiln for the charging step.

36. A method for charging a plurality of incoming fuel modules containing combustible material into a heated zone of a rotating kiln, the method comprising the steps of:
   sampling the combustible material in each of the plurality of fuel modules to determine an amount of a parameter of interest within each fuel module;
   labeling the fuel modules to indicate the amount of the parameter within each fuel module;
   storing the amount of the parameter in each fuel module in a computer memory;
   separating the incoming fuel modules into a plurality of different stages based upon the amount of the parameter contained within each fuel module;
   removing fuel modules stored in the plurality of stages in a selected order to maintain an average amount of the parameter charged into the kiln at substantially a preselected level; and
   charging the selected modules into the kiln into the selected order.

37. The method of claim 30, further comprising the steps of:
   determining an optimum time to charge each fuel module into the rotating kiln to maintain the average amount of the parameter of interest supplied to the kiln substantially at a preselected level, each fuel module being charged into the kiln at substantially said optimum time during the charging step.

38. An apparatus for charging combustible fuel modules into a heated zone of a rotating kiln cylinder, the apparatus comprising:
   a generally cylindrical outer wall configured to replace a section of the rotating kiln cylinder, the cylindrical outer wall being formed to include at least two ports therein, the ports being spaced apart along a periphery of the outer wall;
   at least two drop tubes, one drop tube extending through each of the ports and into the heated zone of the rotating kiln cylinder through the drop tubes at spaced apart locations of the kiln cylinder, the at least two drop tubes including a first drop tube aligned at a first axial position along the longitudinal axis of the generally cylindrical outer wall, and a second drop tube aligned at a second axial position along the longitudinal axis of the generally cylindrical outer wall spaced apart from the first axial position;
   a staging assembly for supporting fuel modules; and
   means for transferring a fuel module between the staging assembly and a selected one of the first and second drop tubes to charge the fuel module into the kiln cylinder through the port in communication with the selected drop tube, the transferring means includes first means for transferring a fuel module into the first drop tube, and second means for transferring a fuel module into the second drop tube.

39. The apparatus of claim 38, further comprising:
   a closure for each port, each closure being movable between an open position and a closed position; and
   means for moving each closure between the closed position and the open position to charge modules through the selected port and into the heated zone.

40. The apparatus of claim 39, further comprising means for controlling the entry of ambient air into the kiln through the ports, the controlling means being coupled to the moving means.

41. The apparatus of claim 40, wherein the moving means includes a cam actuator movable from a first position to open the closure of a selected port as the drop tube coupled to the selected port passes the cam actuator during rotation of the kiln to a second position to permit the drop tube to pass the cam actuator without opening the closure, the controlling means moving the cam actuator to its first position when a fuel module is in a passing drop tube to charge the fuel module into the kiln, the controlling means moving the cam actuator to its second position when a passing drop tube is empty, thereby maintaining the closure in its closed position and preventing ambient air from entering the kiln.

42. The apparatus of claim 38, wherein the transferring means includes at least two transfer tubes, one transfer tube being coupled to each drop tube and means for selectively transferring fuel modules from the staging assembly into a selected transfer tube to charge the fuel module into the kiln cylinder through the drop tube aligned with the selected transfer tube.

43. The apparatus of claim 42, wherein the means for selectively transferring fuel modules from the staging assembly into a selected transfer tube includes an elevator assembly for lifting fuel modules upwardly from the staging assembly into alignment with the selected transfer tube as the kiln cylinder rotates.

44. The apparatus of claim 38, wherein the first and second transferring means each includes an elevator for lifting fuel modules upwardly from the staging assembly into alignment with the first and second sets of drop tubes, respectively.

45. The apparatus of claim 44, wherein the elevators each include a pair of spaced apart, parallel plates for engaging a bottom surface of each fuel module, and means for moving the parallel plates relative to the staging assembly to lift the fuel module away from the staging assembly.

46. The apparatus of claim 38, further comprising a firing system for charging a plurality of incoming fuel modules containing a known amount of a parameter of interest into the kiln cylinder, the firing system including means for separating incoming fuel modules into a plurality of stages based on the parameter amount in each fuel module, means for removing fuel modules from the plurality of stages in a selected order to maintain an average parameter amount for fuel modules charged into the kiln at substantially a preselected level, and means for charging fuel modules into the kiln through the drop tubes in the selected order.

47. The apparatus of claim 46, wherein the means for removing fuel modules from the plurality of stages in a selected order includes means for calculating which of the next available fuel modules from the plurality of stages provides an optimum parameter amount to maintain the average parameter amount charged into the kiln at substantially said preselected level.

48. The apparatus of claim 46, further comprising means for determining an optimum time to charge each fuel module into the rotating kiln to maintain the average amount of a second parameter of interest supplied to the kiln substantially at a second preselected level, the charging means charging each fuel module into the kiln at substantially said optimum time.

49. The apparatus of claim 38, further comprising a firing system for charging a plurality of incoming fuel modules containing a known amount of a parameter of interest into the kiln cylinder, the firing system including means for determining an optimum time to charge each fuel module into the rotating kiln to maintain the average amount of the parameter of interest supplied to the kiln substantially at a preselected level, and means for charging fuel modules into the kiln through the drop tubes at substantially said optimum time.

50. The apparatus of claim 49, wherein the determining means includes means for calculating an optimum firing interval for a next available fuel module based upon an average parameter amount in fuel modules previously charged into the kiln and the parameter amount in the next available fuel module, the firing interval being selected to maintain the average parameter amount at substantially said preselected level.

51. An apparatus for charging combustible fuel modules into a heated zone of a rotating kiln cylinder, the apparatus comprising:

a generally cylindrical outer wall configured to replace a section of the rotating kiln cylinder, the cylindrical outer wall being formed to include at least two ports therein, the ports being spaced apart along a periphery of the outer wall;

a staging assembly for supporting fuel modules;

means for charging fuel modules into the kiln, the charging means being coupled to the outer wall, the charging means including a first drop tube aligned with a port formed at a first axial position along a longitudinal axis of the generally cylindrical outer wall, and a second drop tube aligned with a port formed at a second axial position along the longitudinal axis of the generally cylindrical outer wall spaced apart from the first axial position; and means for transferring a fuel module from the staging assembly into the kiln cylinder through a selected port, the transferring means including first means for transferring a fuel module into the first drop tube, and second means for transferring a fuel module into the second drop tube.

52. The apparatus of claim 51, further comprising:

a closure for each port, each closure being movable between an open position and a closed position; and means for moving each closure between the closed position and the open position to charge modules through the selected port and into the heated zone.

53. The apparatus of claim 52, further comprising means for controlling the entry of ambient air into the kiln through the ports, the controlling means being coupled to the moving means.

54. The apparatus of claim 53, wherein the moving means includes a cam actuator movable from a first position to open the closure of a selected port as the drop tube coupled to the selected port passes the cam actuator during rotation of the kiln to a second position to permit the drop tube to pass the cam actuator without opening the closure, the controlling means moving the cam actuator to its first position when a fuel module is in a passing drop tube to charge the fuel module into the kiln, the controlling means moving the cam actuator to its second position when a passing drop tube is empty, thereby maintaining the closure in its closed position and preventing ambient air from entering the kiln.

55. The apparatus of claim 51, wherein the first and second transferring means each include an elevator for lifting fuel modules upwardly from the staging assembly into alignment with the first and second sets of drop tubes, respectively.

56. The apparatus of claim 55, wherein the elevators each include a pair of spaced apart, parallel plates for engaging a bottom surface of each fuel module, and means for moving the parallel plates relative to the staging assembly to lift the fuel module away from the staging assembly.

57. The apparatus of claim 51, further comprising a firing system for charging a plurality of incoming fuel modules containing a known amount of a parameter of interest into the kiln cylinder, the firing system including means for separating incoming fuel modules into a plurality of stages based on the parameter amount in each fuel module, means for removing fuel modules from the plurality of stages in a selected order to maintain an average parameter amount for fuel modules charged into the kiln at substantially a preselected level, the charging means charging fuel modules into the kiln in the selected order.

58. The apparatus of claim 57, wherein the means for removing fuel modules from the plurality of stages in a selected order includes means for calculating which of the next available fuel modules from the plurality of stages provides an optimum parameter amount to maintain the average parameter amount charged into the kiln at substantially said preselected level.

59. The apparatus of claim 57, further comprising means for determining an optimum time to charge each fuel module into the rotating kiln to maintain an average amount of a second parameter of interest supplied to the kiln substantially at a second preselected level, the charging means charging each fuel module into the kiln at substantially said optimum time.

60. The apparatus of claim 51, further comprising a firing system for charging a plurality of incoming fuel modules containing a known amount of a parameter of interest into the kiln cylinder, the firing system including means for determining an optimum time to charge each fuel module into the rotating kiln to maintain the average amount of the parameter of interest supplied to the kiln substantially at a preselected level, the charging means charging fuel modules into the kiln at substantially said optimum time.

61. The apparatus of claim 60, wherein the determining means includes means for calculating an optimum firing interval for a next available fuel module based upon an average parameter amount in fuel modules previously charged into the kiln and the parameter amount in the next available fuel module, the firing interval being selected to maintain the average parameter amount at substantially said preselected level.

62. A firing system for charging a plurality of incoming combustible fuel modules into a heated zone of a rotating kiln, the firing system comprising:
means for determining the total quantity of heat energy in each of the incoming fuel modules, the determining means including means for reading a heat energy content in each of the incoming fuel modules;
means for rejecting fuel modules which having a total quantity of heat energy higher than a maximum preset value so that the rejected fuel modules are not charged into the kiln, thereby improving the firing consistency of the kiln and reducing carbon monoxide emissions, the rejecting means rejecting each fuel module having a heat energy content above a predetermined value; and
means for charging fuel modules having a total quantity of heat energy less than the maximum preset value into the kiln.

63. The firing systems of claim 62, wherein the determining means also includes means for weighing each of the incoming fuel modules, the rejecting means rejecting fuel modules having a weight above a predetermined maximum weight.

64. The firing system of claim 62, wherein the determining means includes means for weighing each of the incoming fuel modules, the rejecting means rejecting fuel modules having a weight above a predetermined maximum weight.

65. An apparatus for charging combustible fuel modules into a heated zone of a rotating kiln cylinder, the apparatus comprising:
a generally cylindrical outer wall configured to replace a section of the rotating kiln cylinder, the cylindrical outer wall being formed to include at least two ports therein, the ports being spaced apart along a periphery of the outer wall;
at least two drop tubes, one drop tube extending through each of the ports and into the heated zone of the rotating kiln cylinder so that fuel modules are charged into the rotating kiln cylinder through the drop tubes at radially spaced apart locations of the kiln cylinder;
a closure for each port, each closure being movable between an open position and a closed position;
a cam actuator movable from a first position to move the closure of a selected port to the open position as the drop tube coupled to the selected port passes the cam actuator during rotation of the kiln to charge a fuel module through the selected port and into the heated zone, the cam actuator also being movable to a second position to permit the drop tube coupled to the selected port to pass the cam actuator with the closure remaining in its closed position; and
means moving the cam actuator to its first position when a fuel module is in a passing drop tube to charge the fuel module into the kiln and for moving the cam actuator to its second position when a passing drop tube is empty, thereby maintaining the closure of the passing drop tube in its closed position and preventing ambient air from entering the kiln.

66. An apparatus for charging combustible fuel modules into a heated zone of a rotating kiln cylinder, the apparatus comprising:
a generally cylindrical outer wall configured to replace a section of the rotating kiln cylinder, the cylindrical outer wall being formed to include at least two ports therein, the ports being radially spaced apart along a periphery of the outer wall;
at least two drop tubes, one drop tube extending through each of the ports and into the heated zone of the rotating kiln cylinder so that fuel modules are charged into the rotating kiln cylinder through the drop tubes at radially spaced apart locations of the kiln cylinder;
means for supporting fuel modules;
means for calculating an amount of a parameter of interest contained in each fuel module;
means for transferring a fuel module between the supporting means and a selected one of the drop tubes to charge the fuel module into the kiln cylinder through the port in communication with the selected drop tube; and
means for controlling actuation of the transferring means based on the calculated amount of the parameter of interest contained in each fuel module to maintain an average parameter amount for fuel modules charged into the kiln at substantially a preselected level.

67. The apparatus of claim 66, wherein the transferring means includes an elevator for lifting fuel modules upwardly from the supporting means into alignment with the selected drop tube.

68. The apparatus of claim 66, wherein the calculating means includes means for storing the amount of the parameter of interest by weight of each fuel module, means for weighing each fuel module, and means for determining the amount of the parameter of interest in each fuel module using the stored amount of the parameter of interest in each fuel module and the measured weight of each fuel module.

* * * * *